(12) United States Patent
Belisle et al.

(10) Patent No.: US 10,564,836 B2
(45) Date of Patent: Feb. 18, 2020

(54) DYNAMIC MOVEABLE INTERFACE ELEMENTS ON A TOUCH SCREEN DEVICE

(71) Applicant: APPLE INC., Cupertino, CA (US)

(72) Inventors: Melissa J. Belisle, Santa Clara, CA (US); Frances S. Segal, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 1371 days.

(21) Appl. No.: 13/875,128

(22) Filed: May 1, 2013

(65) Prior Publication Data
US 2014/0331130 A1    Nov. 6, 2014

(51) Int. Cl.
G06F 3/00       (2006.01)
G06F 3/0486    (2013.01)
G06F 3/0482    (2013.01)

(52) U.S. Cl.
CPC .......... *G06F 3/0486* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 7,665,028 B2 | 2/2010 | Cummins et al. | |
| 7,725,841 B2 | 5/2010 | Michelman et al. | |
| 8,464,173 B2 * | 6/2013 | Victor | 715/765 |
| 2005/0246664 A1 * | 11/2005 | Michelman et al. | 715/856 |
| 2008/0165153 A1 | 7/2008 | Platzer et al. | |
| 2009/0228820 A1 | 9/2009 | Kim et al. | |
| 2011/0087981 A1 * | 4/2011 | Jeong et al. | 715/765 |
| 2012/0194428 A1 * | 8/2012 | Kwon et al. | 345/157 |
| 2014/0300555 A1 * | 10/2014 | Rogers | 345/173 |

OTHER PUBLICATIONS

Tooltips and Infotips, [online], Microsoft Corporation 2013, [retrieved on Apr. 30, 2013], retrieved from the internet : <URL: www.http://msdn.microsoft.com/en-us/library/windows/desktop/AA511495.ASPX.>, 19 pages.
Ubillos et al., U.S. Appl. No. 13/629,324, filed Sep. 27, 2012.

* cited by examiner

*Primary Examiner* — Anil N Kumar
(74) *Attorney, Agent, or Firm* — Kilpatrick Townsend & Stockton

(57) ABSTRACT

Systems and methods for displaying a moveable interactive element that can display information about control elements are provided. A system and method can include displaying one or more control elements of a user interface, and receiving initial touch input. In response to the initial touch input, the interactive element can displayed in the user interface. Further touch input corresponding to dragging the interactive element onto a control element can be received. The interactive element can be associated with the control element, and content related to the functionality of the control element can be determined. The content can then be displayed within the interactive element.

15 Claims, 16 Drawing Sheets

DYNAMIC MOVEABLE INTERFACE ELEMENTS ON A TOUCH SCREEN DEVICE

BACKGROUND

The present disclosure relates generally to computing devices and more particularly to a computing device displaying content related to the functionality of control elements of a user interface within a moveable interactive element.

Computing devices such as desktop computers and mobile devices (e.g., laptop computers, smart phones, tablet computers, media players, and the like) have become quite popular and play in integral role in our day-to-day lives. For instance, many users carry a mobile device almost everywhere they go and use their devices for a variety of purposes, including sending, receiving, and managing text messages and emails, viewing maps, navigation (e.g., using such maps and/or a GPS receiver), purchasing item in stores (e.g., using contactless payment systems), making and receiving phone calls, and/or accessing the Internet (e.g., to look up information). To facilitate such functionality, computing devices typically utilize an operating system (OS) that can run various types of applications.

Many computing devices include a touchscreen interface that can detect physical contact from a user of the device and perform a corresponding action. For instance, some computing devices can detect when a user has provided a particular gesture (e.g., using one or more of the user's fingertips) on a touchscreen user interface, such as a single-tap, double-tap, drag, swipe, pinch, flick, rotation, multi-touch gesture, and the like. Upon receiving a gesture, such computing devices can generate an event corresponding to the gesture which may cause an application running on the device to perform a particular action.

Applications typically include a user interface with control elements that a user can select, or otherwise interact with, to cause the computing device to perform the various functions of the application. In the case of a touchscreen device, such interaction can include the user providing touch input in the form of a gesture on or near a displayed control element. In many instances, however, users may be unaware of the particular functionalities associated with some or all of the control elements displayed in the user interface of an application. Thus, in such instances, users may be unable to utilize otherwise desirable functionalities of applications running on their device. Users can perform a "trial by error" process whereby control elements are randomly selected to determine their functionality. Such a process, however, can be quite time consuming and ineffective. In some instances, an application may be associated with a user manual that can be installed along with the application, and that includes reference information describing the functionality of the various control elements displayed in the application's user interface. Reviewing such a user manual however, can be a cumbersome process. Further, particularly in the case of a mobile device including a limited display area, reviewing a user manual for an application often involves the user manual occupying all or a portion of the device's display area. Thus, users are unable to utilize the functionalities of the underlying application while the user manual is being displayed.

SUMMARY

Certain embodiments of the invention are directed to a computing device displaying content related to the functionality of control elements of a user interface within a moveable interactive element.

In some embodiments, a computing device can display one or more control elements of a user interface. Initial touch input can be received and, in response, an interactive element can be displayed in the user interface. Further touch input can then be received, the further touch input corresponding to dragging the interactive element onto a control element. The interactive element can be associated with the control element, and content related to the functionality of the control element can be determined. This content can then be displayed within the interactive element.

In some embodiments, after displaying the content within the interactive element, further touch input can be received corresponding to dragging the interactive element associated with the control element to a region of the user interface associated with no control elements. In response, the interactive element can be dissociated from the control element and then can be removed from the user interface.

In some embodiments, the control element may be a first control element, and after displaying the content related to the functionality of the first control element within the interactive element, further touch input can be received corresponding to dragging the interactive element associated with the first control element onto the second control element. The interactive element may be dissociated from the first control element and then associated with the second control element. Content related to the functionality of the second control element can be determined and displayed within the interactive element.

In some embodiments, while content related to the functionality of a control element is displayed within the interactive element, an affordance element can also be displayed within the interactive element. Touch input corresponding to a selection of the affordance element can be received. In response, reference information related to the functionality of the control element can be determined. The reference information can then be displayed in the user interface.

DETAILED DESCRIPTION

Figure 1:
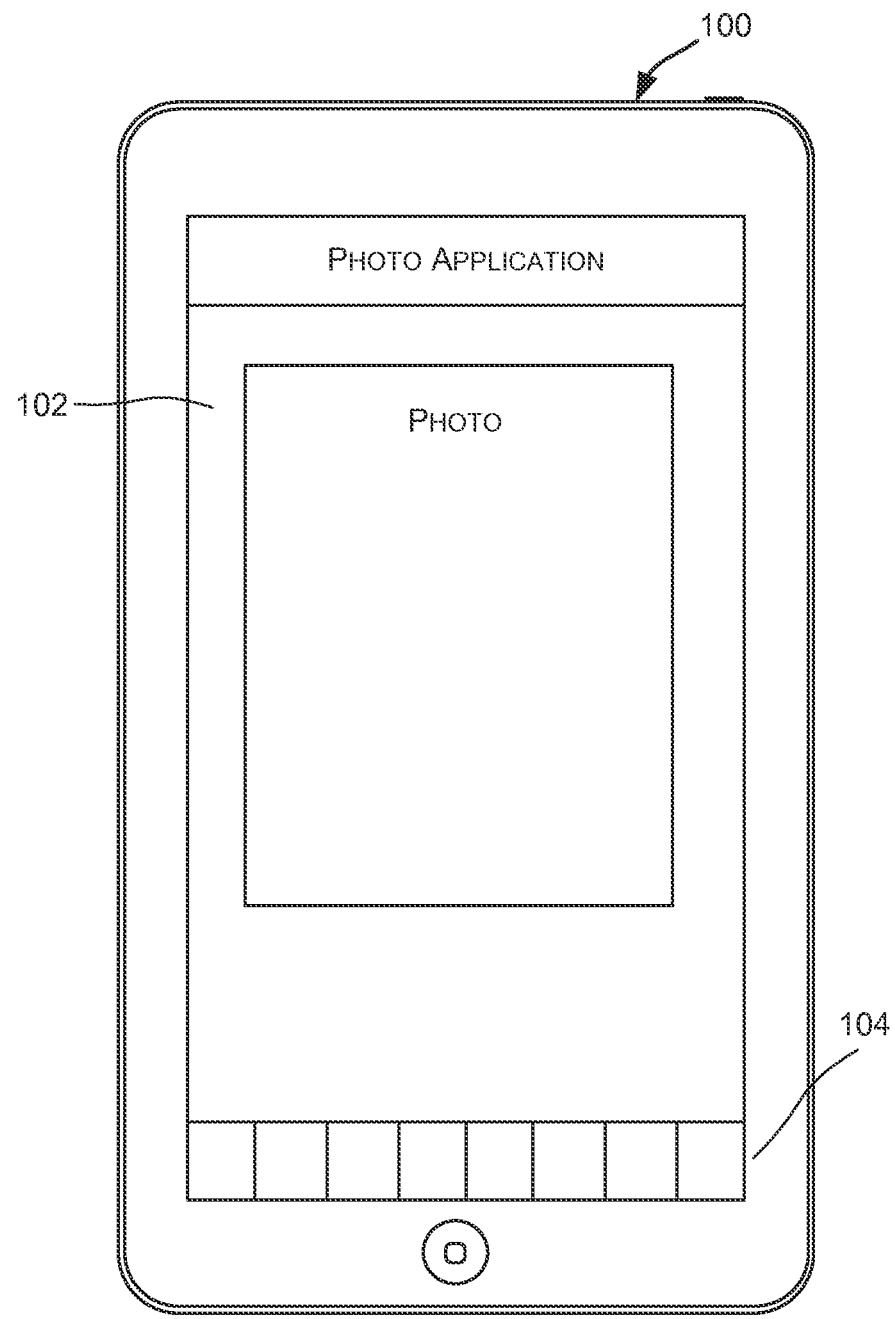
FIG. 1-10 illustrate examples of techniques for displaying content related to the functionality of control elements of a user interface within a moveable interactive element according to some embodiments.

In the following description, for the purposes of explanation, specific details are set forth in order to provide a thorough understanding of embodiments of the invention. However, it will be apparent that various embodiments may be practiced without these specific details.

Certain embodiments of the invention are directed to a computing device displaying content related to the functionality of control elements of a user interface within a moveable interactive element.

In some embodiments, a computing device can display one or more control elements of a user interface. For instance, the user interface can be for an application running on the computing device, and the control elements can each be a graphical user interface element associated with a particular functionality of the application. In some embodiments, the one or more control elements can be application-independent. For instance, control elements can be associated with functionalities of an operating system running on the computing device. Initial touch input from the user can be received by the computing device and, in response, an interactive element can be displayed in the user interface. In some embodiments, the initial touch input may correspond to an initiation of an application. For instance, upon executing the application for the first time in response to touch input provided by the user, the interactive element can be displayed in the user interface. In some embodiments, the initial touch input may correspond to a user selection of a help element displayed in the user interface. For instance, the help element may appear in the same user interface that includes the one or more control elements. In some embodiments, the help element can be displayed to the user in a separate user interface such as a settings menu, options menu, tools menu, help menu, etc.

The interactive element displayed by the computing device in response to the initial touch input may be a graphical user interface element that can be manipulated by the user. For instance, the interactive element can be moved to various locations within the user interface in response to further touch input provided by the user. In some embodiments, the further touch input may include a "dragging" gesture whereby the user applies a contact (e.g., a finger) onto a region of the touchscreen on or near the displayed interactive element and maintains the contact as the user "drags" their finger to a different region of the user interface. The displayed interactive element can be graphically "moved" about the user interface in accordance with the dragging gesture provided by the user.

In some embodiments, further touch input corresponding to dragging the interactive element onto a control element can be received, and the interactive element can be associated with the control element. For instance, upon determining that the touch input corresponding to dragging the interactive element onto the control element has stopped, the interactive element can be displayed as being fixed adjacent to, or overlapping with, the control element in the user interface. Upon associating the interactive element with the control element, content related to the functionality of the control element can be determined. Such content may be stored in, and retrieved from, one or more sources such as a memory of the computing device and/or one or more remote databases (e.g., web-based server computers). In some embodiments, the content may be stored in the form of a data table that includes any suitable information that relates to the functionality of the control element, such as a name or identifier of the control element, a summary or explanation of the functionality of the control element (e.g., the function performed in response to the user selecting, or otherwise interacting with, the control element), and the like. The content related to the functionality of the control element can then be displayed within the interactive element in the user interface.

In some embodiments, the interactive element can be dragged to another user interface element in response to further touch input provided by the user. The interactive element can be disassociated from the first control element and then associated with the second control element. Content related to the functionality of the second control element can be determined and displayed within the interactive element. If the user desires to have the interactive element removed from the user interface, in some embodiments, the user can provide touch input corresponding to dragging the interactive element to a region of the user interface that includes no control elements. In response, the computing device can remove the interactive element from the user interface.

In various embodiments, the interactive element can display content related to the functionality of the associated control element while occupying only a small portion of the application's user interface. Thus, the underlying application may be both functional and visible to the user while the interactive element is being displayed. Further, upon being dragged by the user onto a control element, content related to the control element can be displayed within the interactive element immediately. Thus, users may be provided with information about the functionalities of an application's control elements in a quick and convenient manner, thereby reducing the need for a user to use a "trial by error" approach or to perform the cumbersome and inefficient task of reviewing an application's user manual to determine such functionalities.

As used herein, a "control element" may refer to a graphical user interface element that is displayed within a user interface by a computing device and that is associated with a particular functionality. A control element may be selected, or otherwise interacted with, by a user. For instance, a user may select or interact with a control element by providing touch input in the form of a gesture such as a single-tap, double-tap, drag, swipe, pinch, flick, rotation, multi-touch gesture, and the like. In response to such touch input, a computing device can perform the functionality associated with the control element. A control element can be associated with a functionality of an application running on a computing device. A control element can also be application-independent. For instance, a control element can be associated with a functionality of an operating system that is running on a computing device and that supports the execution of applications installed on the computing device. A control element can be a button, hyperlink, window, text box, drop-down list, scrollbar, list box, combo box, check box, radio button, cycle button, datagrid, menu link, tab, slider, input field, or any other graphical user interface element that is displayed in a user interface, associated with a functionality, and that can be selected (or otherwise interacted with) by a user.

As used herein, a "help element" may refer to a graphical user interface element that is displayed within a user interface by a computing device and that causes an interactive element (as described herein) to be displayed in the user interface in response to user interaction. A help element may be selected, or otherwise interacted with, by a user. For instance, a user may select a help element by providing touch input in the form of a gesture (e.g., a tap gesture or other input). In response, a computing device can display an interactive element in the user interface. A help element can also be displayed in a user interface different than the user interface in which an interactive element is displayed. For instance, a help element can be displayed within a help menu, options menu, tools menu, settings menu, or the like.

As used herein, an "affordance element" may refer to a graphical user interface element that is displayed within a user interface by a computing device and that causes reference information to be displayed in response to user interaction. An affordance element can be displayed within an interactive element (as described herein) and may be selected, or otherwise interacted with, by a user. For instance, a user may select an affordance element by providing touch input in the form of a gesture (e.g., a tap gesture or other input). In response, a computing device can display reference information. In some embodiments, reference information can relate to the functionality of a control element with which the interactive element is associated. For instance, the reference information can include all or a portion of a user manual for an application and/or operating system associated with the control element. In some embodiments, in response to user selection of an affordance element, reference information can be included in a web page displayed by a web browser application.

FIGS. 1-10 illustrate examples of techniques for displaying content related to the functionality of control elements of a user interface within a moveable interactive element according to some embodiments. The examples depicted in FIGS. 1-13 are not intended to be limiting.

In FIGS. 1-10, a computing device 100 is shown displaying a user interface 102 of a photo application being executed by computing device 100. This, however, is not intended to be limiting. An interactive element as described in the present disclosure may be used to provide content related to the functionality of control elements for any suitable application. Exemplary applications may include, without limitation, message applications (e.g., e-mail, SMS, voice, etc.), web browsers, calendar applications, news applications, games applications, media playback and/or editing applications, social network applications, productivity application, sports applications, travel applications, weather applications, entertainment applications, photo editing applications, utility applications, map applications, word processors, text editors, search engine interfaces, source code editors, database query tools, command line interpreters, and the like. Further, in some embodiments, the interactive element can be used to provide content related to the functionality of control elements that are application-independent. For instance, such control elements can relate to the functionalities of an operating system running on computing device 100.

In the examples shown in FIGS. 1-10, computing device 100 is an iPhone® provided by Apple Inc. of Cupertino, Calif. In various embodiments, computing device 100 can be any other suitable computing device including portable and non-portable devices. Exemplary embodiments of such computing devices include the iPad® and iPod Touch® devices provided by Apple Inc. of Cupertino, Calif., laptop computers, other mobile devices, desktop computers, kiosks, and the like In FIG. 1, a user interface 102 of a photo application is displayed by computing device 100. As shown in FIG. 1, the user interface 102 can include one or more control elements 104 that may each correspond to a particular functionality of the photo application. In various embodiments, user interface 102 can be displayed on a touch-sensitive interface (i.e. a touchscreen) of computing device 100 that can both display information to a user and also receive touch input from the user. The touchscreen displaying user interface 102 may be configured to detect physical contact from the user of computing device 100 such as a user-provided gesture (e.g., a single-tap, double-tap, drag, swipe, pinch, flick, rotation, multi-touch gestures, and the like). Upon receiving such a gesture, computing device 100 can generate an event corresponding to the gesture which may cause an application running on the device (e.g., the photo application of FIG. 1) to perform a particular function.

Figure 2:
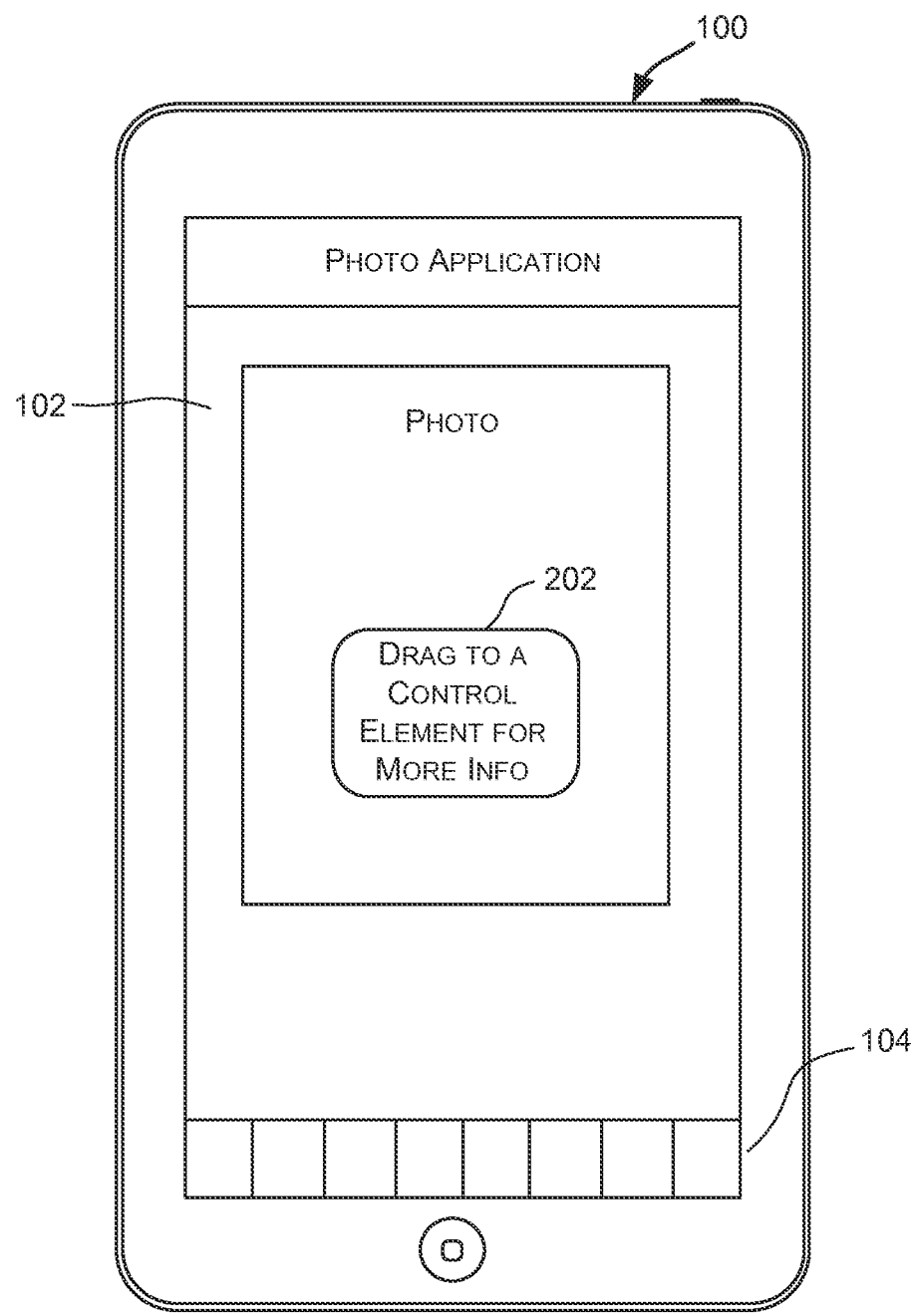

As illustrated in FIG. 2, initial touch input can be received by computing device 100 and, in response, an interactive element 202 can be displayed in user interface 102. The initial touch input can correspond to a number of different user inputs according to various embodiments of the invention. For instance, in some embodiments, interactive element 202 can be displayed in response to an application being executed by computing device 100 for the first time. Thus, upon receiving touch input corresponding to the initial execution of the photo application shown in FIGS. 1-10, computing device 100 can display interactive element 202 as depicted in FIG. 2 to provide the user with a way to learn about the functionalities of control elements 104. In some embodiments, interactive element 202 can be displayed by computing device 100 each time an application (e.g., the photo application) is executed. In some embodiments, the initial touch input that prompts the computing device 100 to display interactive element 202 can be a user-selection of a help element displayed in user interface 102 (not shown). The help element can also be displayed in a separate user interface such as a help menu, options menu, tools menu, settings menu, etc. In such embodiments, upon selection of the help element, computing device 100 may transition back to user interface 102 including interactive element 202 as illustrated in FIG. 2.

As seen in FIG. 2, interactive element 202 can display textual information prompting the user to drag the interactive element 202 to any of control elements 104 to receive further information about the functionality of the control element. Interactive element 202 can display any suitable combination of letters, numbers, characters, or other textual information upon being displayed in user interface 202. In some embodiments, interactive element 202 can include one or more symbols or graphics in addition to, or in lieu of textual information.

Interactive element 202 can be manipulated by the user. For instance, interactive element 202 can be moved to various locations within user interface 102 in response to further touch input provided by the user. In some embodiments, the further touch input may include a "dragging" gesture whereby the user applies a contact (e.g., a finger) to a region of the touchscreen on or near interactive element 202 and maintains the contact as the user "drags" their finger to a different region of user interface 102. Interactive element 202 can be graphically "moved" about user interface 102 by computing device 100 in accordance with the dragging gesture provided by the user.

Figure 3:
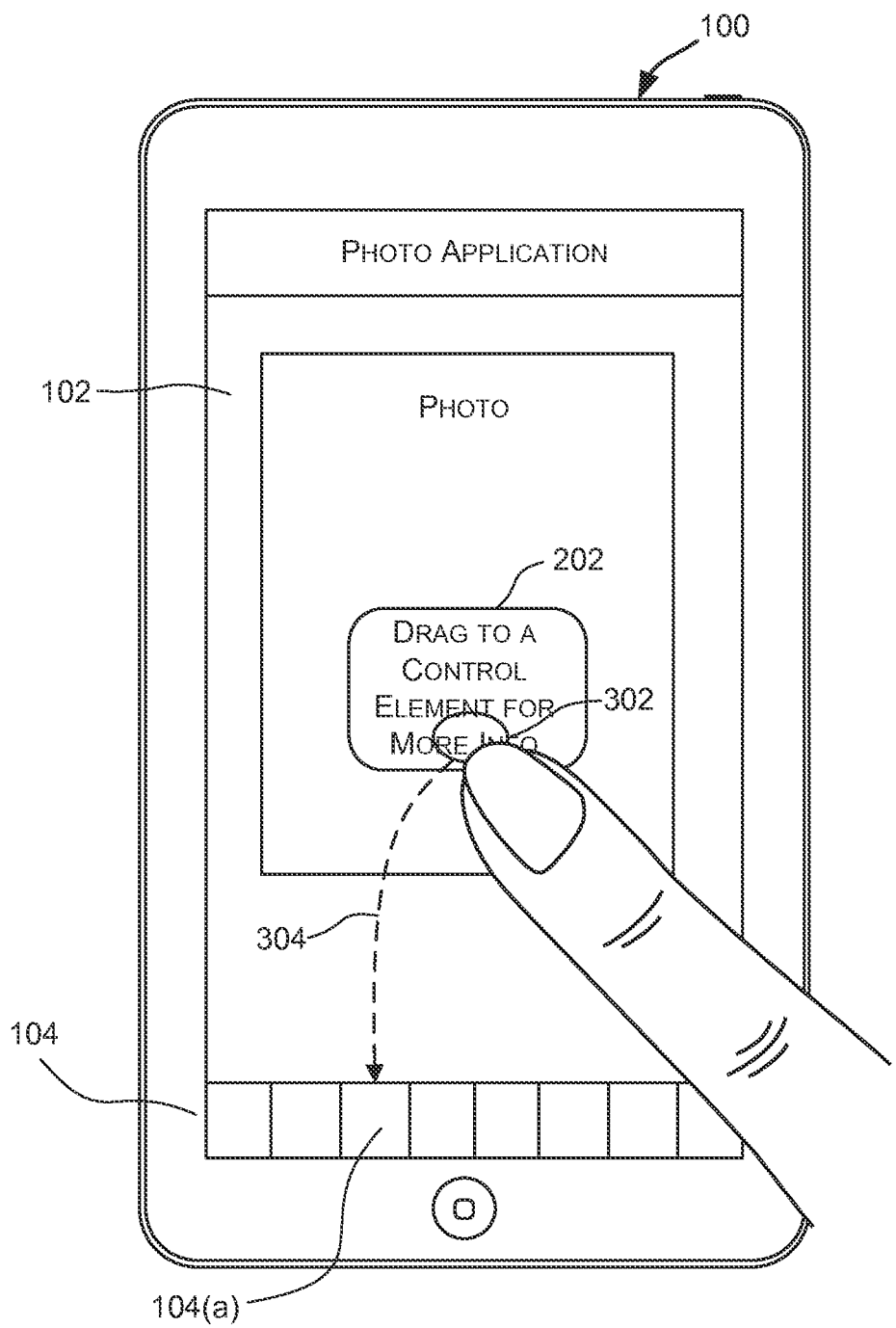

In FIG. 3, the user may want to receive information about the functionality of one or more of control elements 104 displayed in user interface 102. For instance, the user may want to know the functionality of control element 104(*a*). As depicted in FIG. 3, the user can place a contact 302 (e.g., a finger) on a region of the touchscreen on, overlapping, or in the vicinity of interactive element 202, and can move contact 302 in the direction of control element 104(*a*) along a path indicated by arrow 304 to drag interactive element 202 onto control element 104(*a*). In various embodiments, interactive element 202 can be moved along any suitable path. As described herein, dragging interactive element 202 "onto" a control element (e.g., onto control element 104(*a*)) can include moving interactive element 202 over a control element such that interactive element 202 overlaps the control element. In some embodiments, dragging interactive element 202 onto a control element can include moving interactive element 202 in the vicinity of the control element so that the elements are adjacent to each other but not overlapping. In some embodiments, to complete the dragging input, the user can release contact 302 (e.g., by removing the user's finger from the touchscreen) once interactive element 202 has been moved to the desired position.

Figure 4:
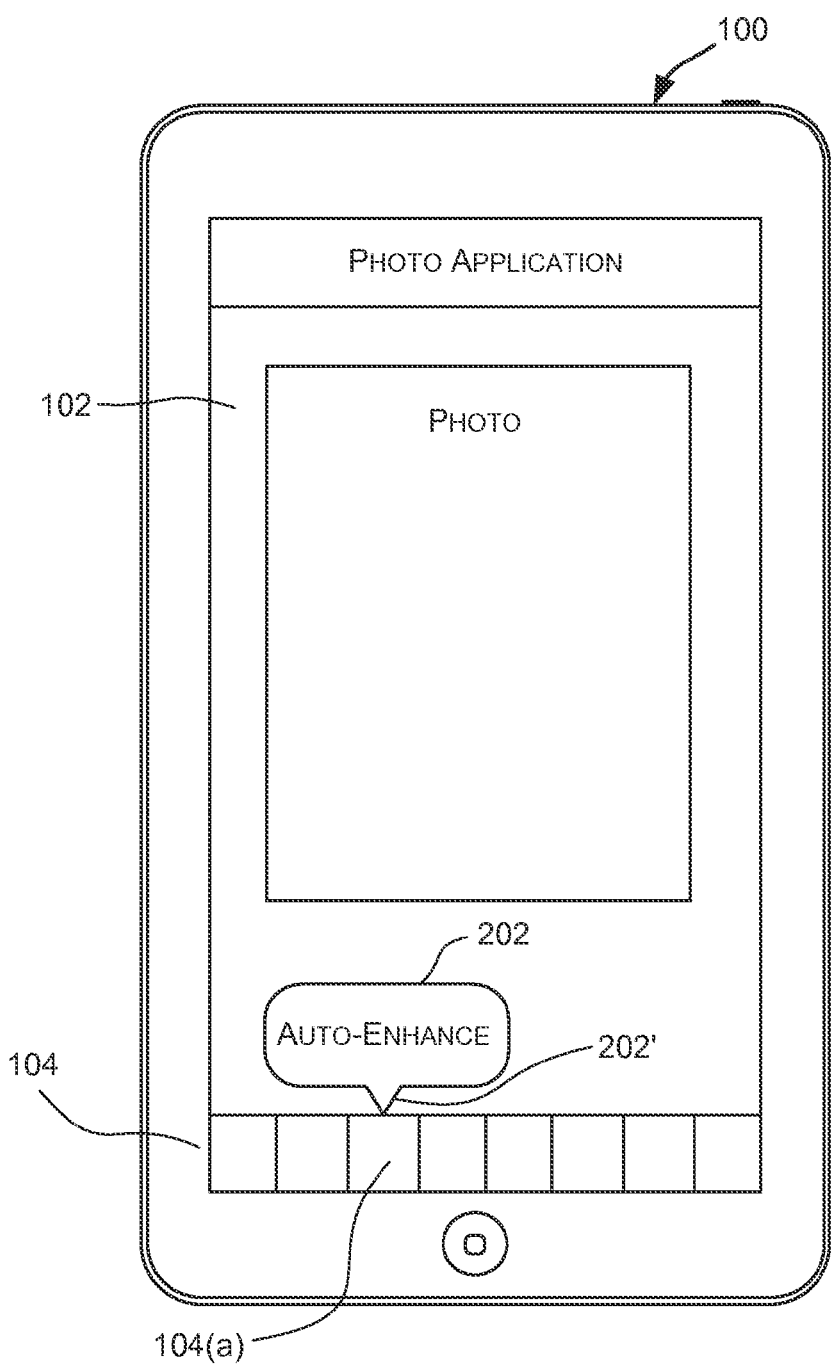

In FIG. 4, in response to the user dragging interactive element 202 onto control element 104(*a*), interactive element 202 can be "associated" with control element 104(*a*). For instance, computing device 100 may determine that the touch input corresponding to dragging interactive element 202 onto control element 104(*a*) has stopped (e.g., that the dragging input is complete), and may then fix interactive element 202 on or adjacent to control element 104(*a*). As illustrated in FIG. 4, such association may include displaying an association portion 202' of interactive element 202 that provides the user with an indication that interactive element 202 is associated with control element 104(*a*). In some embodiments, the association may involve a graphical representation of interactive element 202 "snapping" into place. For instance, upon detecting that interactive element 202 is overlapping, or some predetermined distance from, control element 104(*a*) and that the dragging input has stopped (e.g., that the user has removed their finger from the touchscreen), computing device 100 may cause interactive element 202 to automatically position itself relative to control element 104(*a*). As illustrated in FIG. 4, such repositioning may include centering interactive element 202 with respect to control element 104(*a*) and/or displaying association portion 202' in contact with control element 104(*a*). In some embodiments, the user can be informed that interactive element 202 is associated with control element 104(*a*) using any suitable indication including graphical indications (e.g., a color change, highlighting effect, shading effect, and the like of interactive element 202 and/or control element 104 (*a*)), audio indications, animation effects, etc.

As further illustrated in FIG. 4, in response to the user dragging interactive element 202 onto control element 104 (*a*), content relating to the functionality of control element 104(*a*) can be determined by computing device 100 and displayed within interactive element 202. For instance, in the exemplary photo application shown in FIG. 4, the content displayed in interactive element 202 indicates to the user that control element 104(*a*) provides an "auto-enhance" functionality. Such functionality may involve an automatic adjustment of the contrast, white balance, brightness, and/or other aspects of a photo displayed in user interface 102. Thus, by dragging interactive element 202 onto control element 104(*a*), content can be displayed within interactive element 202 that informs the user of the function performed by computing device 100 in response to the user selecting (or otherwise interacting with) control element 104(*a*). In some embodiments, the content can be stored in and retrieved from one or more sources. For instance, the content can be stored in a memory of computing device 100 and/or in one or more remote databases (e.g., web-based server computers). The content may be stored in the form of a data table that includes a mapping of control elements and corresponding content. For instance, for an application installed on computing device 100, the data table can include a list of control elements for the application and a corresponding list of content that describes the functionality of each control element. In some embodiments, the data table can include a list of control elements that are application-independent (e.g., associated with the functionalities of an operating system running on computing device 100) and a list of content that describes the functionality of each corresponding control element. For a given control element, such information can include a name or identifier of the control element, a summary or explanation of the functionality of the control element (e.g., the function performed in response to the user selecting, or otherwise interactive with, the control element), or any other suitable information relating to the functionality of the control element.

As further illustrated in FIG. 4, interactive element 202 can be resized in accordance with the amount of displayed content. For instance, the size of interactive element 202 as displayed in user interface 102 can be automatically reduced or increased (e.g., in length and/or height) in accordance with the number of characters associated with the content to be displayed within interactive element 202. In some embodiments, interactive element 202 can be resized in accordance with further touch input provided by the user. For instance, in response to the user providing a "pinch" gesture, the size of interactive element 202 can be reduced and/or increased in size. By optimizing the size of interactive element 202, the portion of the overall display area of user interface 102 occupied by interactive element 202 can be reduced thereby maintaining the visibility and functionality of the underlying application.

Figure 5:
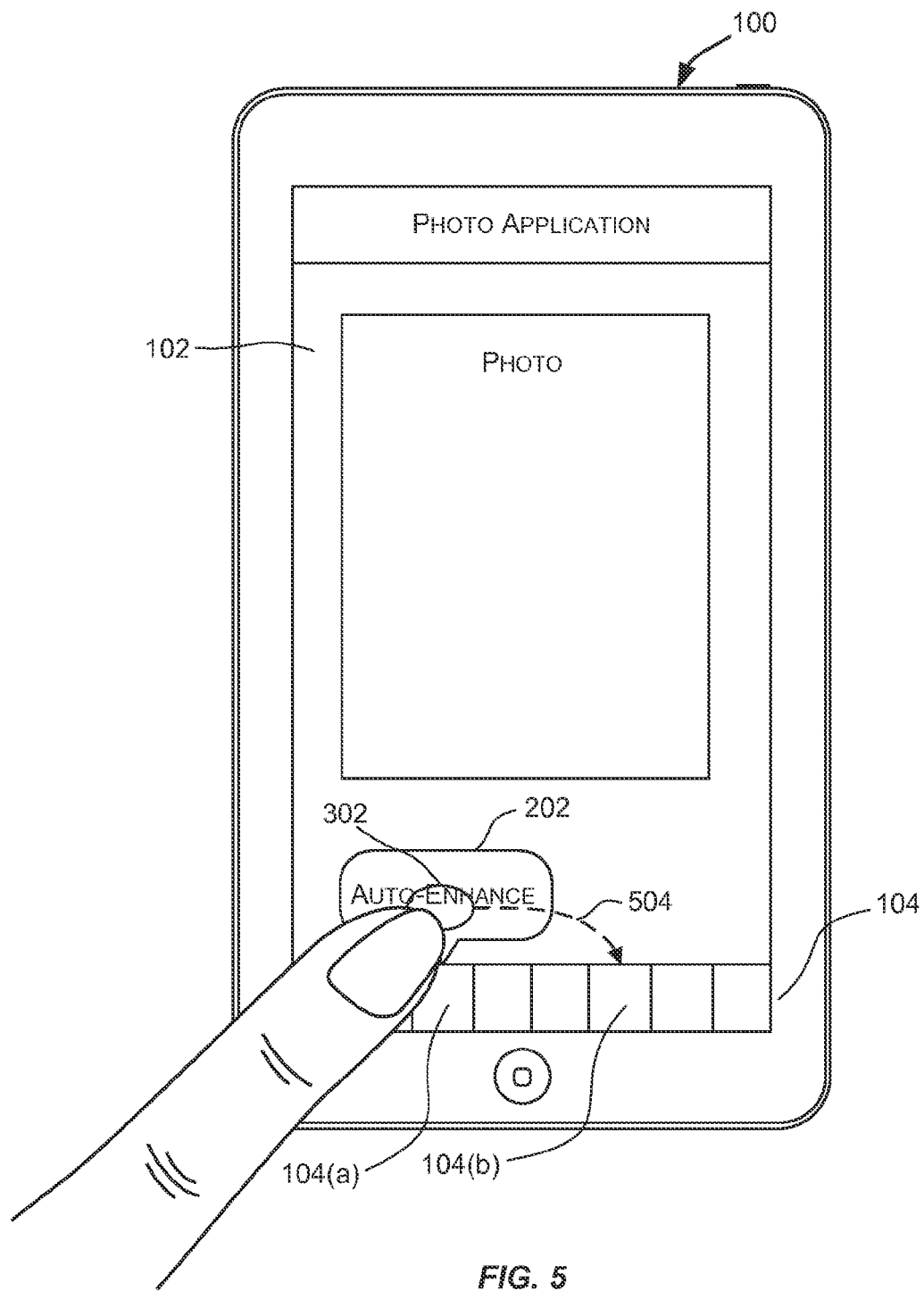

As illustrated in FIG. 5, upon being informed of the functionality of control element 104(*a*), the user may want then want to know the functionality of another control element, such as control element 104(*b*). As depicted in FIG. 5, the user can place contact 302 on a region of the touchscreen on, overlapping, or in the vicinity of interactive element 202, and can move contact 302 in the direction of control element 104(*b*) along a path indicated by arrow 504 to drag interactive element 202 onto control element 104(*b*). As described above, to complete the dragging input, the user can release contact 302 (e.g., by removing the user's finger from the touchscreen) once interactive element 202 has been moved to the desired position.

In some embodiments, as interactive element 202 is moved away from control element 104(*a*), interactive element 202 can be "disassociated" from control element 104(*a*). For instance, association portion 202' may no longer be displayed once interactive element 104(*a*) is dragged away from control element 104(*a*). In some embodiments, the dissociation may involve computing device 100 displaying default textual information (as shown in FIG. 2) within interactive element 202. In various embodiments, the user can be informed that interactive element 202 has been disassociated from control element 104(*a*) using any suitable indication including graphical indications (e.g., a color change, highlighting effect, shading effect, and the like of interactive element 202 and/or control element 104(*a*)), audio indications, animation effects, etc.

Figure 6:
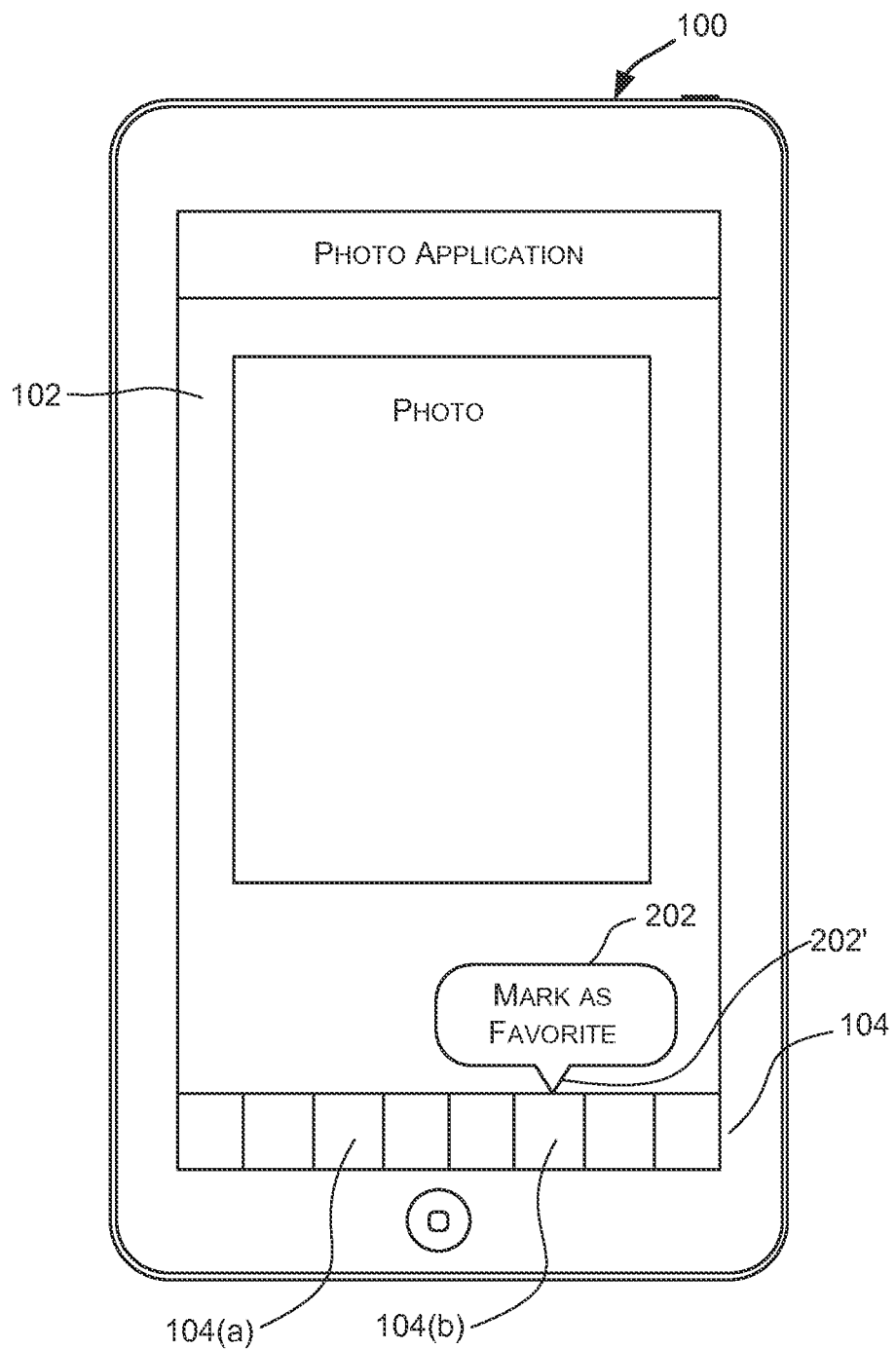

As illustrated in FIG. 6, in response to the user dragging interactive element 202 from control element 104(*a*) onto control element 104(*b*), interactive element 202 can be "associated" with control element 104(*b*), and content related to the functionality of control element 104(*b*) can be determined and displayed within interactive element 202. Such association and content determination can be the same or similar to that described above with respect to the association and content determination that may occur upon dragging interactive element 202 onto control element 104(a) as illustrated in FIG. 4. In the exemplary photo application shown in FIG. 6, the content displayed in interactive element 202 indicates to the user that control element 104(b) provides a "Mark as Favorite" functionality. Such a functionality may be used, for instance, to add a photo displayed in user interface 102 to a list of "favorite" photos that can be accessed at a later time. Thus, by dragging interactive element 202 from control element 104(a) onto control element 104(b), content can be displayed within interactive element 202 that informs the user of the function performed by computing device 100 in response to the user selecting control element 104(b).

Figure 7:
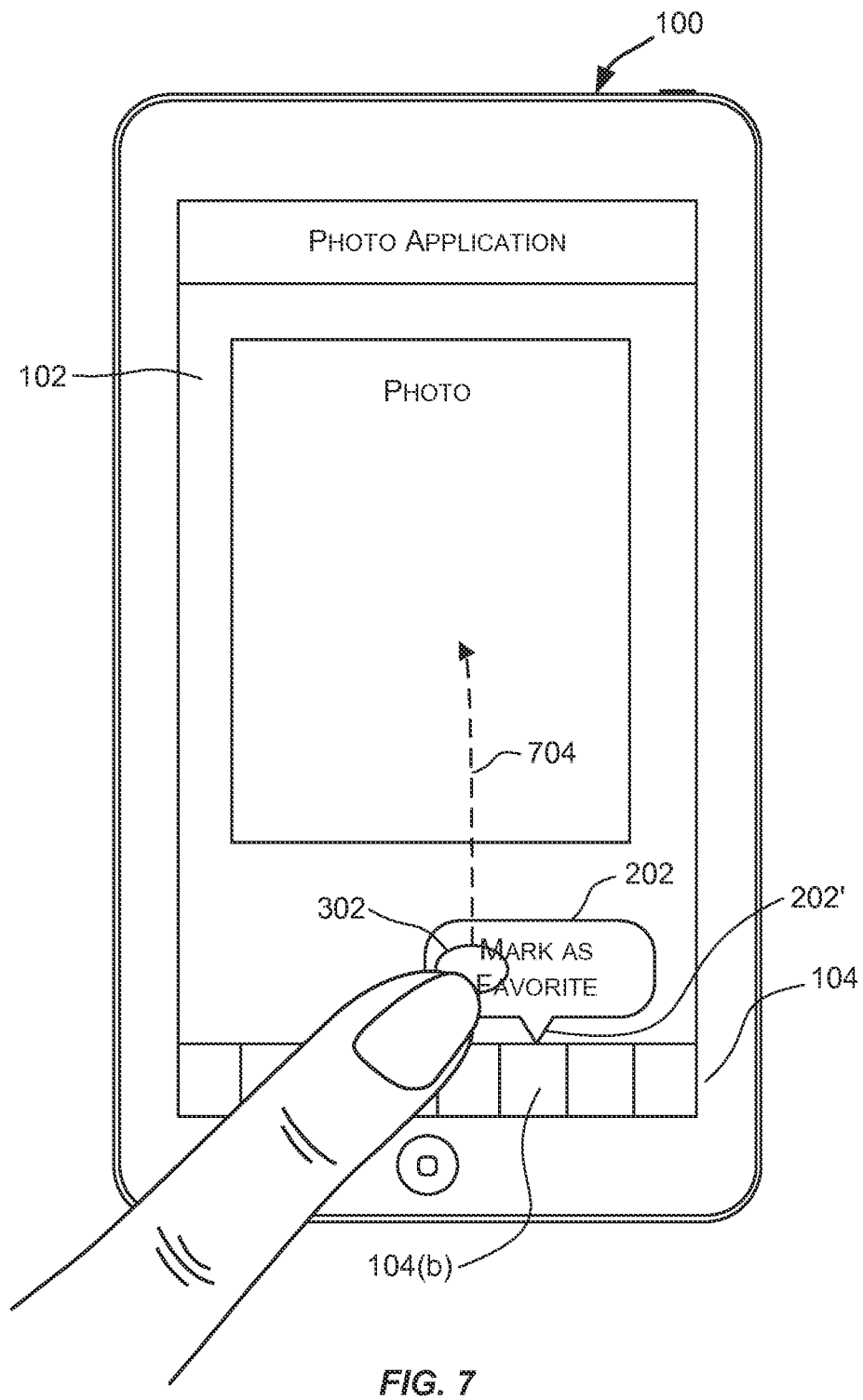

If the user desires that interactive element 202 no longer be displayed in user interface 102, in various embodiments, interactive element 202 can be removed in a number of different ways. As illustrated in FIG. 7, in some embodiments, interactive element 202 can be removed in response to the user dragging interactive element 202 to a region of user interface 102 associated with no control elements. For instance, the user can place contact 302 on a region of the touchscreen one or near interactive element 202, and can move contact 302 towards a region of user interface 102 along a path indicated by arrow 704 to drag interactive element 202 to a region of user interface 102 that includes no control elements. In various embodiments, interactive element 202 can be moved along any suitable path from a control element to a region including no control elements. In some embodiments, as interactive element 202 is moved away from control element 104(b) or any other of control elements 104, interactive element 202 can be "disassociated" from the control element. Such disassociation can be the same or similar to that described above with respect to the disassociation that may occur upon dragging interactive element 202 from control element 104(a) onto control element 104(b) as illustrated in FIG. 5. In response to the dragging of interactive element 202 into a region of user interface 102 including no control elements, interactive element 202 can be removed from user interface 102 (e.g., resulting in the depiction of user interface 102 in FIG. 1).

In some embodiments, interactive element 202 may be removed in response to other touch input provided by the user. For instance, computing device 100 can cause interactive element 202 to no longer be displayed in response to any suitable gesture (e.g., a single-tap, double-tap, swipe, pinch, flick, rotation, multi-touch gesture, and the like), button input, or other input provided by the user. In some embodiments, interactive element 202 may be removed after a predetermined period of time (e.g., a "time-out" function). For instance, if interactive element 202 is not moved or otherwise manipulated by the user upon the expiration of a specific time interval computing device 100 may cause interactive element 202 to be removed from user interface 102.

In some embodiments, interactive element 202 can be disassociated from control elements 104 without removing interactive element 202 from user interface 102. For instance, in response to the dragging gesture depicted in FIG. 7 or other touch input, or the expiration of a predetermined period of time, interactive element 202 can remain displayed in user interface 102 but be disassociated from any of control elements 104. In such embodiments, interactive element 202 can revert back to interactive element 202 as depicted in FIG. 2.

Figure 8:
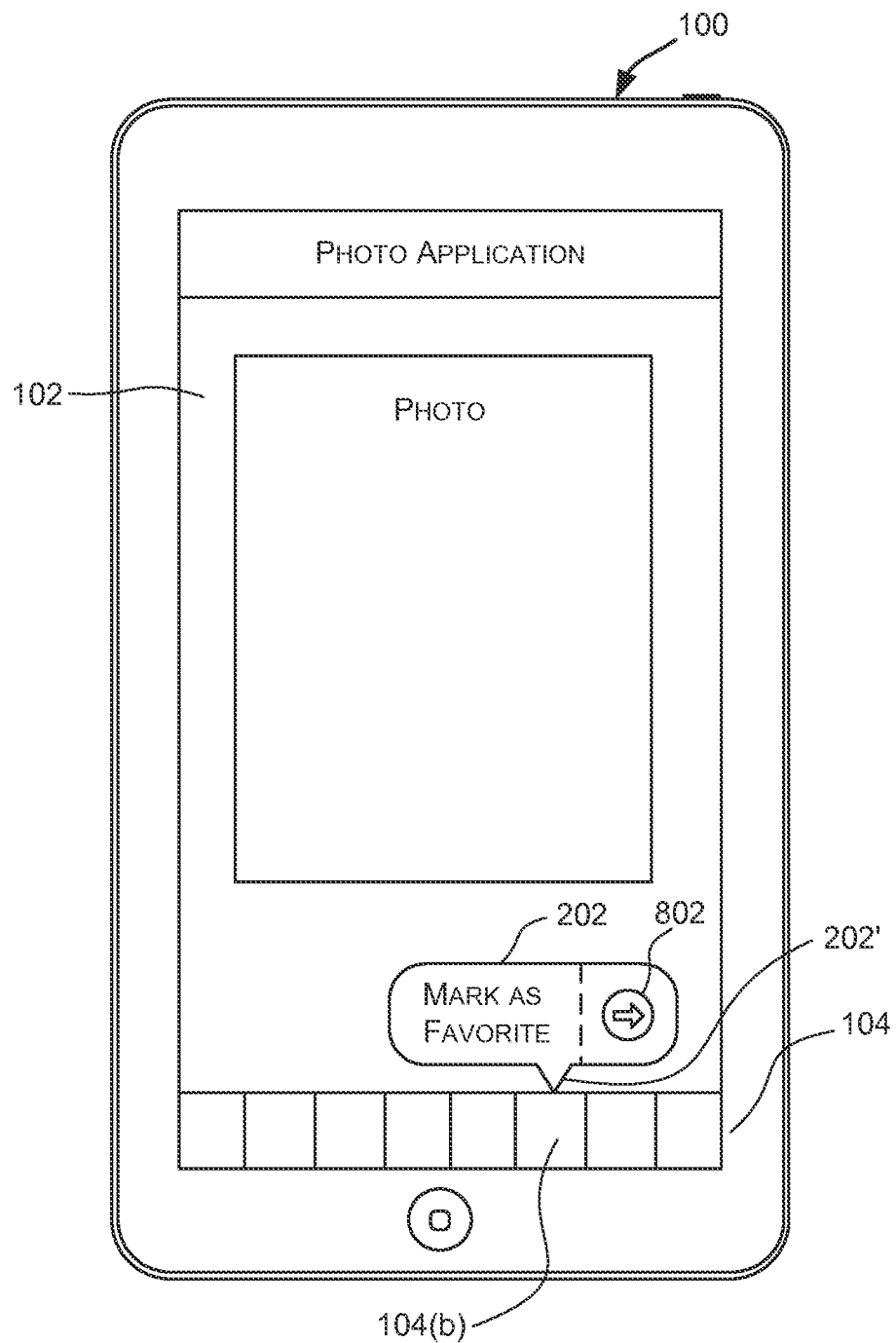
Figure 9:
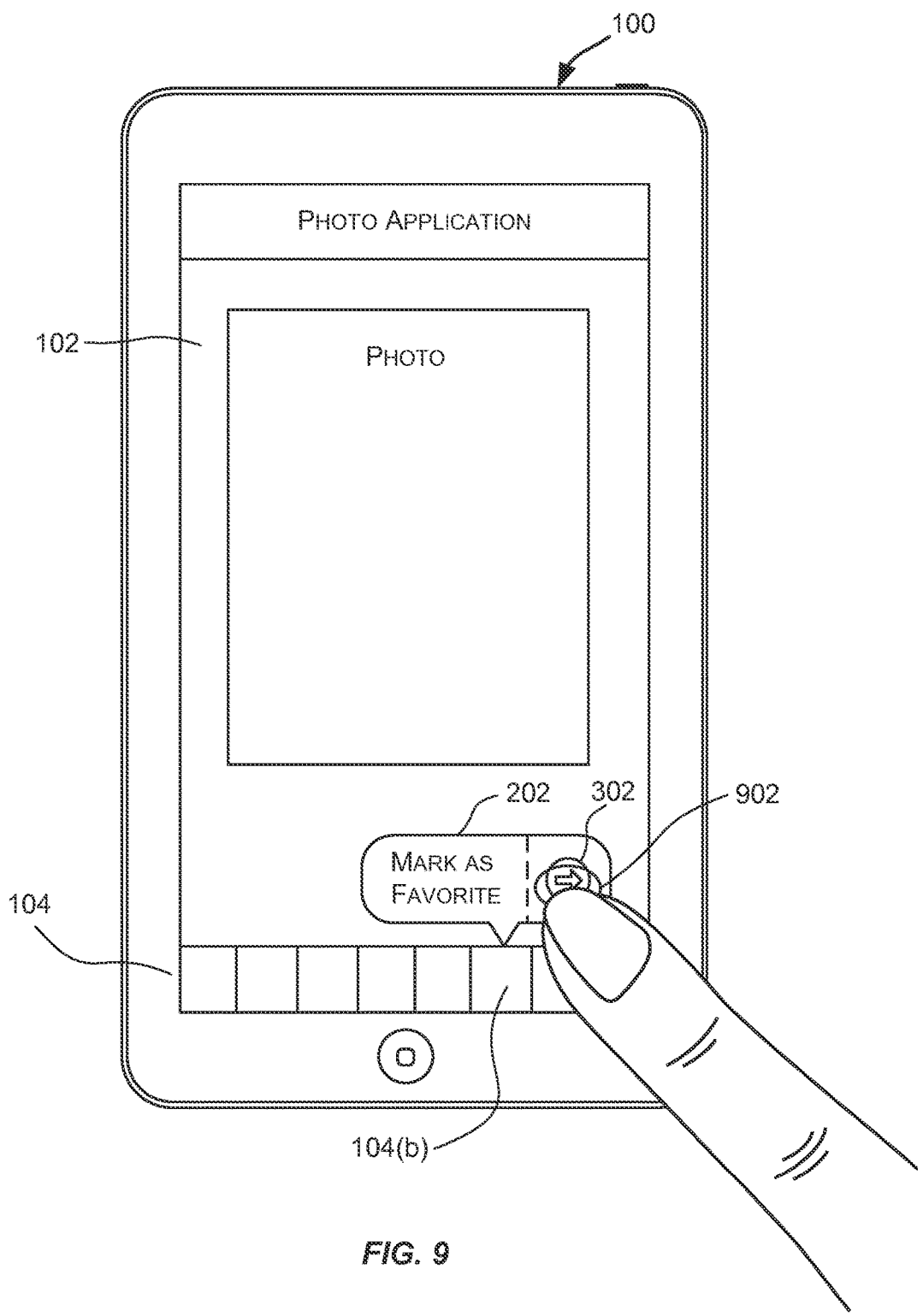

In some circumstances, the user may want more information about the functionality of a control element than that displayed in interactive element 202. As illustrated in FIG. 8, in some embodiments, a selectable affordance element 802 can be displayed within interactive element 202 while the content related to the functionality of an associated control element (i.e. control element 104(b)) is also being displayed. In response to the user selecting affordance element 802, computing device 100 can display additional reference information about the control element. For instance, as illustrated in FIG. 9, the user can place contact 302 onto a region of the touchscreen on or near affordance element 802, and can select affordance element (e.g., using a tap gesture or other touch input).

Figure 10:
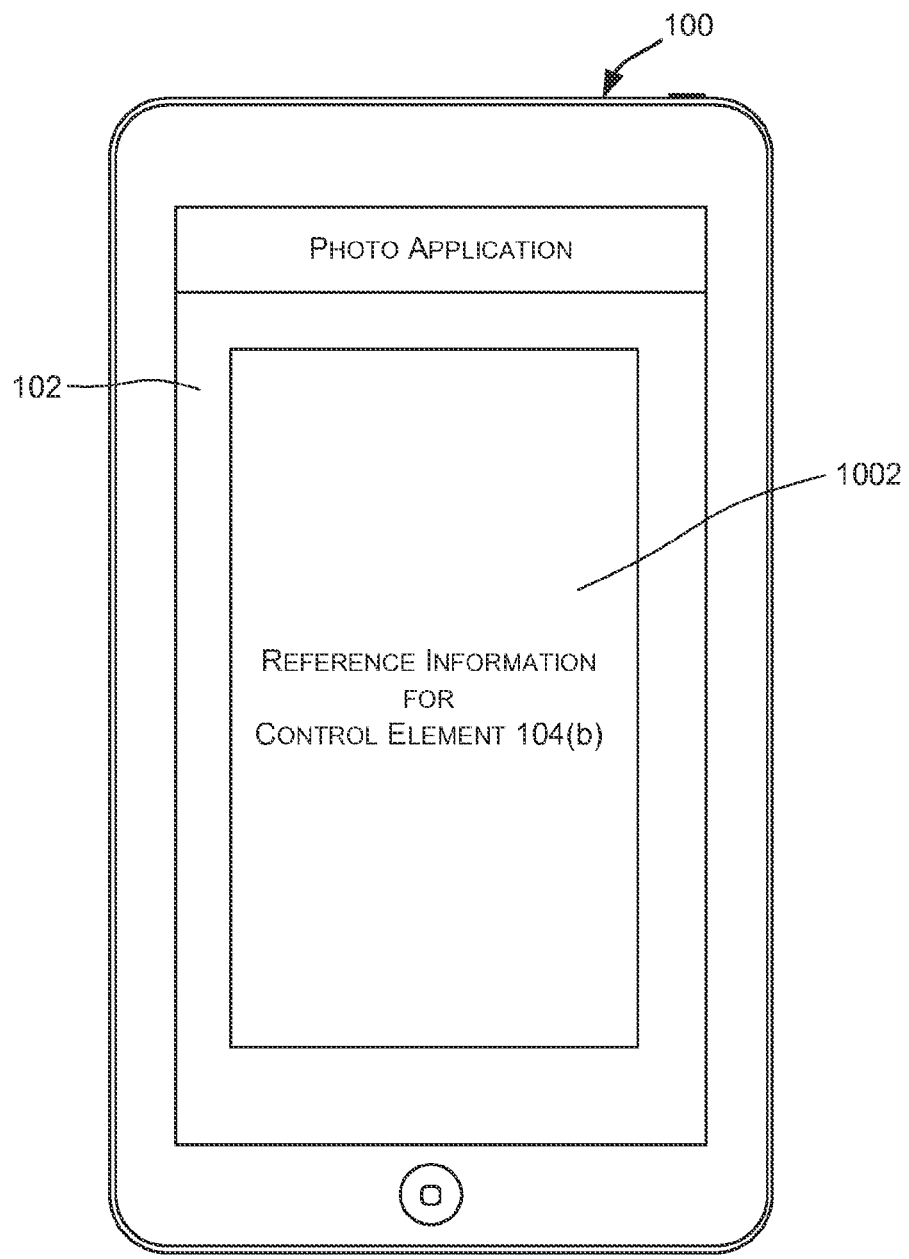

As illustrated in FIG. 10, upon receiving the touch input corresponding to the user's selection of affordance element 802, reference information 1002 can be displayed in user interface 102. In some embodiments, the reference information provided in response to selection of an affordance element can relate to the functionality of the control element with which the interactive element is associated. Thus, as further illustrated in FIG. 10, reference information 1002 can relate to the functionality of control element 104(b) since affordance element 802 is selected, as depicted in FIG. 9, while interactive element 202 is associated with control element 104(b). As with the content displayed in interactive element 202 described above, reference information 1002 can be stored in and retrieved from a memory of computing device 100 and/or a remote database. In some embodiments, reference information 1002 can include all or a relevant portion of a user manual for the application and/or operating system running on computing device 100. In some embodiments, upon detecting the user's selection of affordance element 802, computing device 100 can execute a separate application (e.g., a web browser) to display a webpage that includes reference information 1002. In some embodiments, the web browser application can be run simultaneously with the application including the control elements. In other embodiments, the web browser application can be executed in lieu of the application including the control elements. In such embodiments, the application including the control elements can be closed just prior to the web browser application being opened and, upon reviewing reference information 1002, the user can provide touch input that may cause computing device 100 to close the web browser application and to re-open the application including the control elements.

Figure 11:
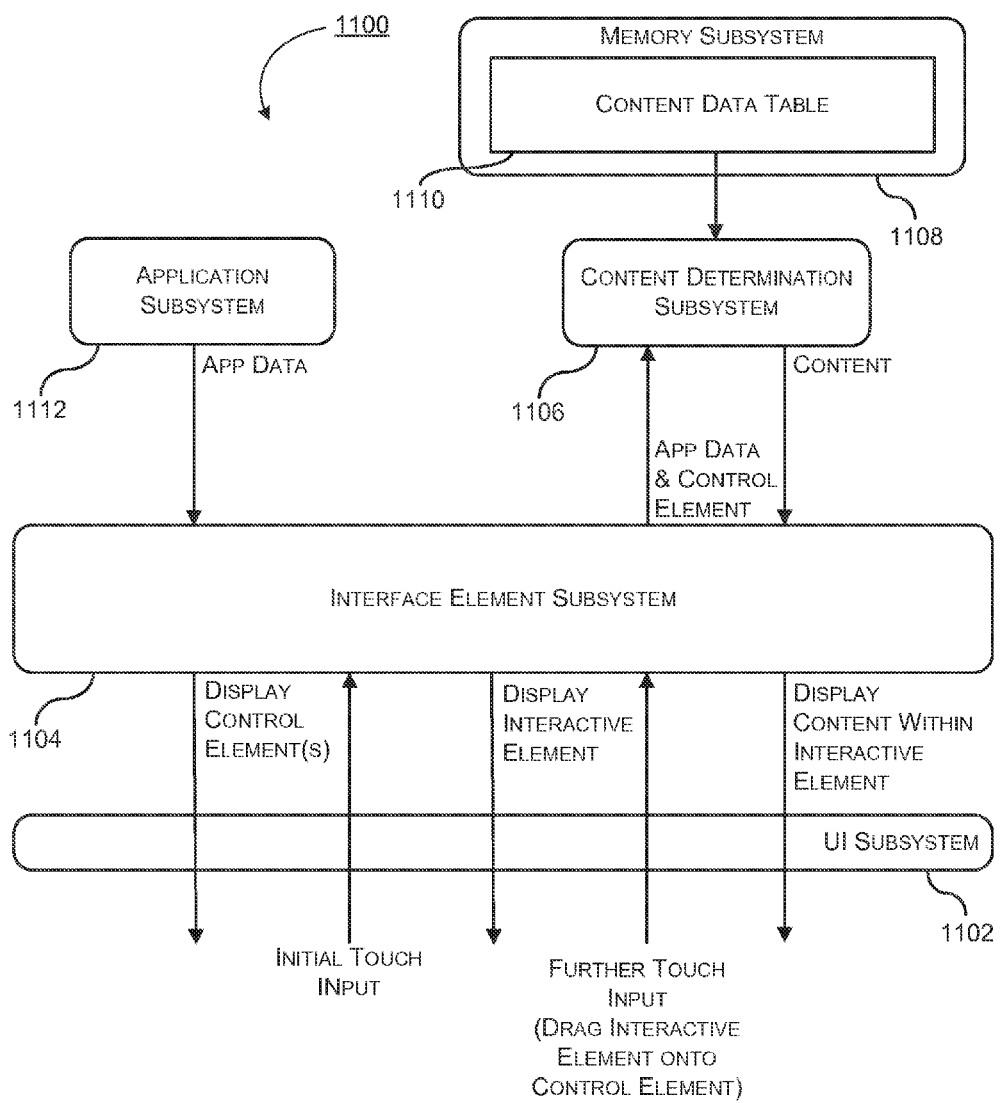
FIG. 11 illustrates a simplified diagram of a system that may incorporate one or more embodiments of the invention.

FIG. 11 illustrates a simplified diagram of a system 1100 that may incorporate one or more embodiments of the invention. In the embodiment depicted in FIG. 11, system 1100 includes multiple subsystems including a user interaction (UI) subsystem 1102, an interface element subsystem 1104, a content determination subsystem 1106, a memory subsystem 1108 storing a content data table 1110, and an application subsystem 1112. One or more communication paths may be provided enabling one or more of the subsystems to communicate with and exchange data with one another. One or more of the subsystems depicted in FIG. 11 may be implemented in software, in hardware, or combinations thereof. In some embodiments, the software may be stored on a transitory or non-transitory medium and executed by one or more processors of system 1100.

It should be appreciated that system 1100 depicted in FIG. 11 may have other components than those depicted in FIG.

11. Further, the embodiment shown in FIG. 11 is only one example of a system that may incorporate one or more embodiments of the invention. In some other embodiments, system 1100 may have more or fewer components than shown in FIG. 11, may combine two or more components, or may have a different configuration or arrangement of components. In some embodiments, system 1100 may be part of a computing device (e.g., computing device 100 depicted in FIGS. 1-10). For instance, system 1100 may be part of a portable communications device, such as a mobile telephone, a smart phone, or a multifunction device. Exemplary computing devices may include, without limitation, the iPhone®, iPod Touch®, and iPad® devices from Apple Inc. of Cupertino, Calif. In some other embodiments, system 1100 may also be incorporated in other computing devices such as laptop computers, desktop computers, kiosks, and the like.

UI subsystem 1102 may provide an interface that allows a user to interact with system 1100. UI subsystem 1102 may output information to the user. For instance. UI subsystem 1102 may include a display device such as a monitor or a screen. UI subsystem 1102 may also enable the user to provide inputs to system 1100. In some embodiments, UI subsystem 1102 may include a touch-sensitive interface (i.e. a touchscreen) that can both display information to a user and also receive inputs from the user. For instance, in some embodiments, UI subsystem 1102 can receive touch input from a user. Such touch input may correspond to one or more gestures, such as a drag, swipe, pinch, flick, single-tap, double-tap, rotation, multi-touch gesture, and/or the like. In some other embodiments, UI subsystem 1102 may include one or more input devices that allow a user to provide additional inputs to system 1100 such as, without limitation, a mouse, a pointer, a keyboard, or other input device. In certain embodiments, UI subsystem 1102 may further include a microphone (e.g., an integrated microphone or an external microphone communicatively coupled to system 1100) and voice recognition circuitry configured to facilitate audio-to-text translation and to translate audio input provided by the user into commands that cause system 1100 to perform various functions.

Memory subsystem 1108 may be configured to store data and instructions used by some embodiments of the invention. In some embodiments, memory subsystem 1108 may include volatile memory such as random access memory or RAM (sometimes referred to as system memory). Instructions or code or programs that are executed by one or more processors of system 1100 may be stored in the RAM. Memory subsystem 1108 may also include non-volatile memory such as one or more storage disks or devices, flash memory, or other non-volatile memory devices. In some embodiments, memory subsystem 1108 can store content data table 1110. In some embodiments, content data table 1110 can include content related to the functionality of control elements associated with various applications. For instance, for an application installed on a computing device implementing system 1100, the data table can include a list of control elements for the application and a corresponding list of content that describes the functionality of each control element. In some embodiments, the data table can include a list of control elements that are application-independent (e.g., associated with the functionalities of an operating system running on the computing device) and a list of content that describes the functionality of each corresponding control element. For a given control element, such information can include a name or identifier of the control element, a summary or explanation of the functionality of the control element (e.g., the function performed in response to the user selecting, or otherwise interacting with, the control element), or any other suitable information relating to the functionality of the control element.

As described above, system 1100 may be part of a computing device. Thus, in some embodiments, memory subsystem 1108 may be part of the computing device. In some embodiments, however, all or part of memory subsystem 1108 may be part of one or more remote server computers (e.g., web-based servers accessible via the Internet).

In some embodiments, UI subsystem 1102, interface element subsystem 1104, content determination subsystem 1106, memory subsystem 1108, and application subsystem 1112, working in cooperation, may be responsible for displaying content related to the functionality of control elements of a user interface within a moveable interactive element. For instance, application subsystem 1112 can provide application ("app") data to interface element subsystem 1104. The app data may include data identifying an application being executed by system 1100 and one or more control elements associated with the application. Interface element subsystem 1104 can cooperate with UI subsystem 1102 to display the one or more control elements of the application on a touchscreen display, for instance. Before or after the one or more control elements are displayed, interface element subsystem 1104 can receive initial touch input from UI subsystem 1102 as provided by a user. As described herein, such initial touch input may include one or more gestures corresponding to the user initiating the application (e.g., executing an application for the first time), selecting a help element displayed in a user interface of the application or in a separate options menu, tools menu, help menu, etc., or other suitable action. In response, interface element subsystem 1104 can cooperate with UI subsystem 1102 to display an interactive element to the user on the touchscreen.

Further touch input can be received by interface element subsystem 1104 from UI subsystem 1102 as provided by the user. For instance, the user may provide touch input corresponding to dragging the interactive element onto a control element. In some embodiments, interface element subsystem 1104 can cooperate with UI subsystem 1102 to provide a graphical representation to the user of the interactive element being associated with the control element. In response to the dragging input, interface element subsystem 1104 can pass an identifier of the control element and at least a portion of the app data (e.g., an identifier of the application) to content determination subsystem 1106. Content determination subsystem 1106 can then communicate with memory subsystem 1108 to determine content related to the functionality of the control element. For instance, content determination subsystem 1106 can access content data table 1110 stored in memory subsystem 1108 to retrieve content related to the functionality of the control element with which the interactive element has been associated. This content can be passed to interface element subsystem 1104 which can cooperate with UI subsystem 1102 to display the content related to the functionality of the control element within the interactive element.

In some embodiments, UI subsystem 1102, interface element subsystem 1104, content determination subsystem 1106, memory subsystem 1108, and application subsystem 1112, working in cooperation, can perform a number of additional functions described herein. For instance, if the user drags the interactive element from the first control element onto a second control element, an identifier of the second control element can be passed to content determination subsystem 1106 which can communicate with memory subsystem 1108 to determine content related to the functionality of the second control element. In such embodiments, interface element subsystem 1104 can cooperate with UI subsystem 1102 to display the content related to the functionality of the second control element within the interactive element. In some embodiments, interface element subsystem 1104 can cooperate with UI subsystem 1102 to cause the interactive element to no longer be displayed. For instance, in response to the user dragging the interactive element to a region of the user interface including no control elements, the interactive element can be removed from the touchscreen display. Further, in some embodiments, the interactive element can include an affordance element that can be selected by the user to receive additional reference information for a control element. In such embodiments, content data table 1110 can include the additional reference information for control elements associated with various applications such as relevant portions of user manuals that further describe the functionality of the control elements. Thus, interface element subsystem 1104 can receive a user selection of the affordance element from UI subsystem 1102, and can cooperate with content determination subsystem 1106 and UI subsystem 1102 to display the additional reference information to the user.

Figure 12:
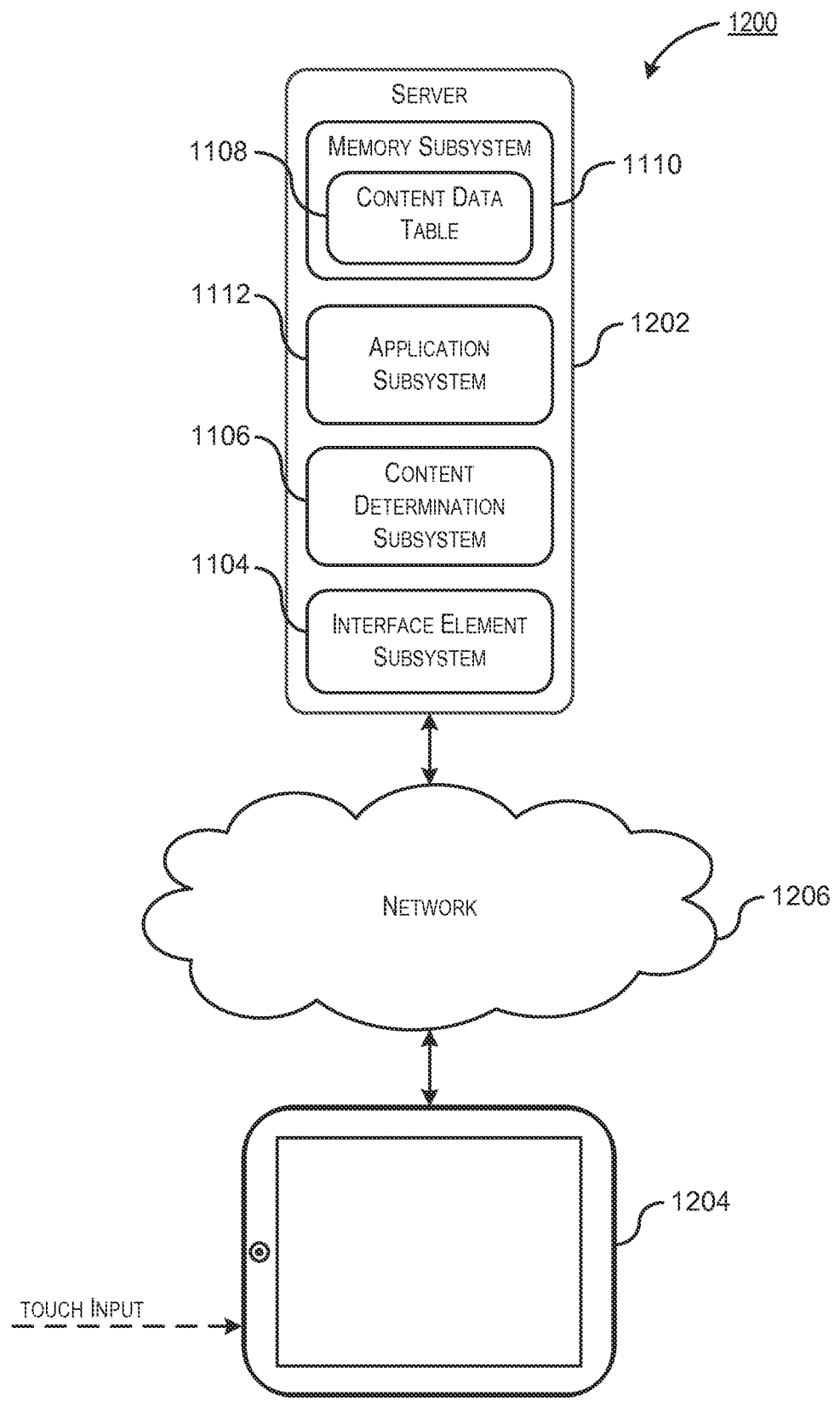
FIG. 12 illustrates a simplified diagram of a distributed system that may incorporate one or more embodiments of the invention.

System 1100 depicted in FIG. 11 may be provided in various configurations. In some embodiments, system 1100 may be configured as a distributed system where one or more components of system 1000 are distributed across one or more networks in the cloud. FIG. 12 illustrates a simplified diagram of a distributed system that may incorporate one or more embodiments of the invention. In the embodiments depicted in FIG. 12, interface element subsystem 1104, content determination subsystem 1106, application subsystem 1112, and memory subsystem 1108 storing content data table 1110 are provided on a server 1202 that is communicatively coupled with a remote computing device 1204 via a network 1206.

Network 1206 may include one or more communication networks, which could be the Internet a local area network (LAN), a wide area network (WAN), a wireless or wired network, an Intranet, a private network, a public network, a switched network, or any other suitable communication network. Network 1206 may include many interconnected systems and communication links including but not restricted to hardwire links, optical links, satellite or other wireless communications links, wave propagation links, or any other ways for communication of information. Various communication protocols may be used to facilitate communication of information via network 1206, including but not restricted to TCP/IP, HTTP protocols, extensible markup language (XML), wireless application protocol (WAP), protocols under development by industry standard organizations, vendor-specific protocols, customized protocols, and others.

In the configuration depicted in FIG. 12, touch input can be received at computing device 1204 and, in response, content related to the functionality of control elements can be displayed by computing device 1204. In such embodiments, interface element subsystem 1104 can communicate with computing device 1204 via network 1206 to cause one or more control elements of a user interface to be displayed on a touchscreen, for instance, of computing device 1204. Initial touch input can be received at computing device 1204 which can be transmitted to server 1202. In response, interface element subsystem 1104 can cause an interactive element to be displayed on computing device 1204. Further touch input corresponding to dragging the interactive element onto a control element can be received at computing device 1204 which can communicate the further touch input to server 1202 via network 1206. Interface element subsystem 1104 can communicate with computing device 1204 to cause an association of the interactive element with the control element to be displayed on computing device 1204. As described above with respect to system 1100 illustrated by FIG. 11, interface element subsystem 1104 can work in cooperation with content determination subsystem 1106, application subsystem 1112, and memory subsystem 1108 to determine content related to the functionality of the control element. The content can be communicated by server 1202 to computing device 1204 via network 1206 to cause computing device 1204 to display the determined content within the interactive element. In some embodiments, the subsystems of server 1202 can work cooperatively with computing device 1204 to perform a number of additional functions such as determining and displaying content relating to the functionality of other control elements (e.g., a $2^{nd}$ control element, $3^{rd}$ control element, $4^{th}$ control element, etc.) within the interactive element, removing the interactive element from the user interface, determining and displaying reference information including further details relating to the functionality of a control element, and any other suitable function.

In the configuration depicted in FIG. 12, interface element subsystem 1104, content determination subsystem 1106, application subsystem 1112, and memory subsystem 1108 are remotely location from computing device 1204. In some embodiments, server 1202 may facilitate the display of content related to the functionality of control elements of a user interface within a moveable interactive element, as described herein, for multiple computing devices. The multiple computing devices may be served concurrently or in some serialized manner. In some embodiments, the services provided by server 1202 may be offered as web-based or cloud services or under a Software as a Service (SaaS) model.

It should be appreciated that various different distributed system configurations are possible, which may be different from distributed system 1200 depicted in FIG. 12. The embodiment shown in FIG. 12 is thus only one example of a distributed system and is not intended to be limiting.

Figure 13:
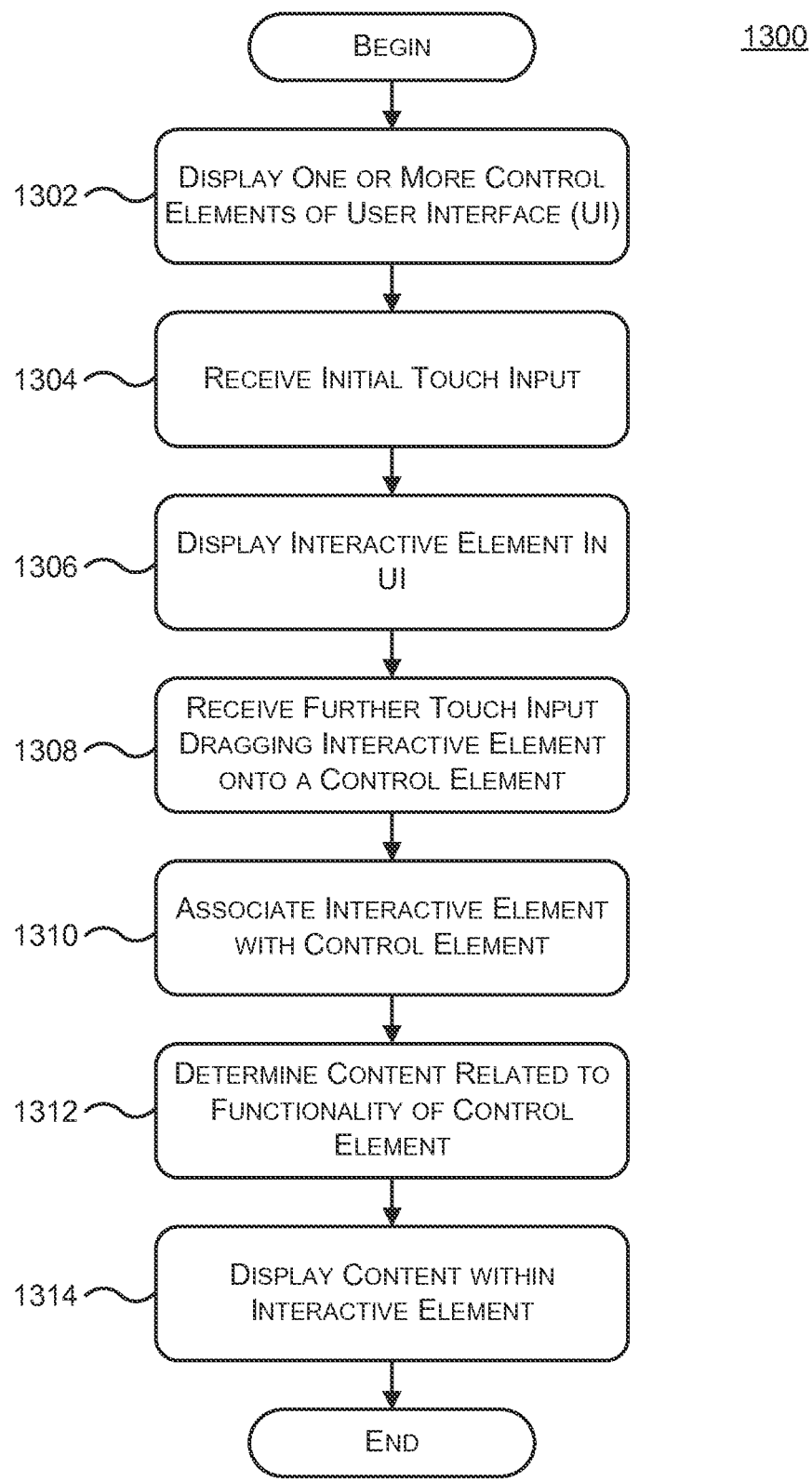
FIG. 13 illustrates a simplified flowchart depicting a method of displaying content related to the functionality of control elements of a user interface within a moveable interactive element according to some embodiments.
Figure 15:
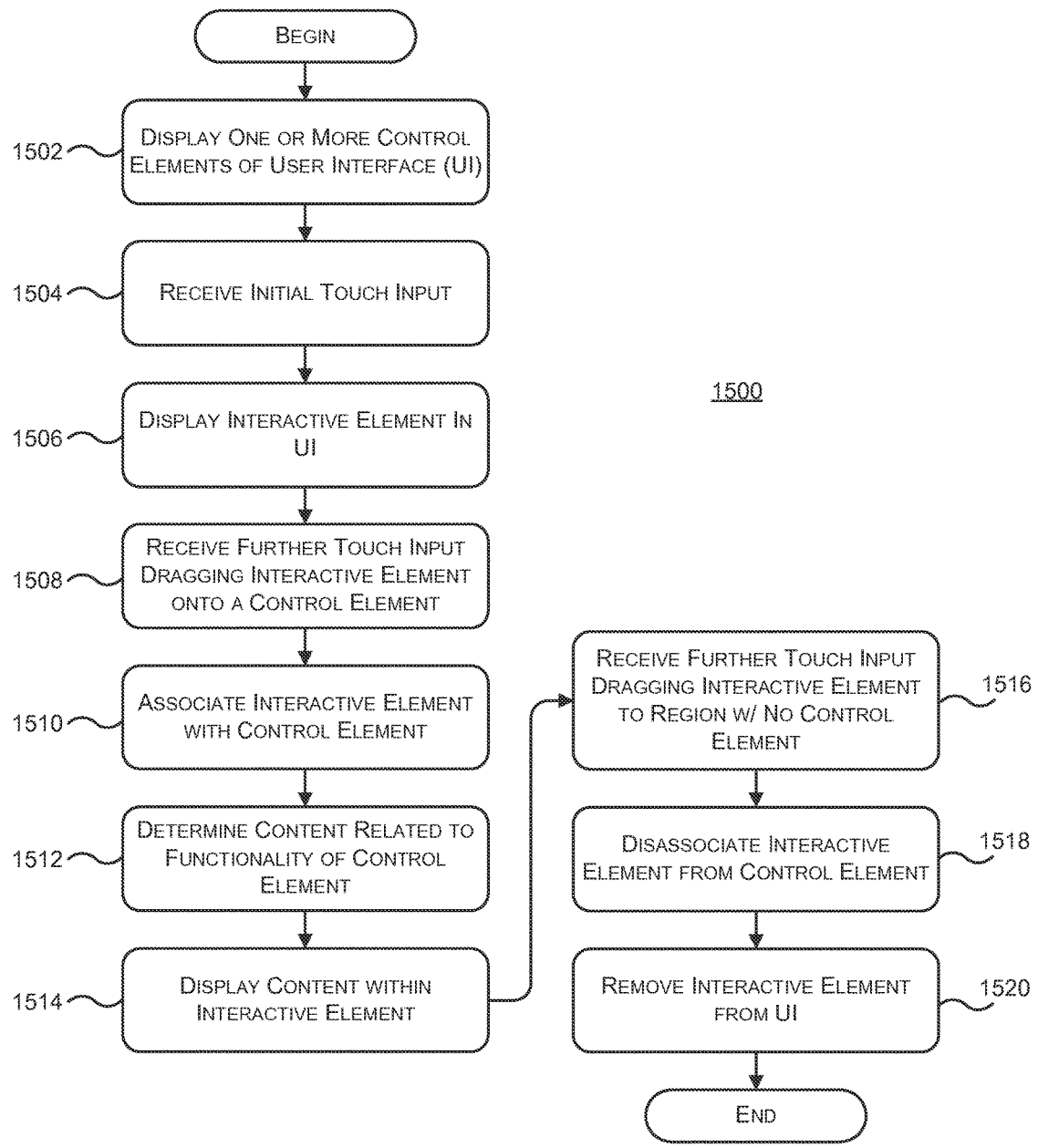
FIG. 15 illustrates a simplified flowchart depicting a method of removing an interactive element from a user interface in response to receiving touch input corresponding to dragging the interactive element to a region of the user interface associated with no control elements according to some embodiments.

FIG. 13 illustrates a simplified flowchart depicting a method 1300 of displaying content related to the functionality of control elements of a user interface within a moveable interactive element according to some embodiments. The processing depicted in FIG. 13 may be implemented in software (e.g., code, instructions, and/or a program) executed by one or more processors, hardware, or combinations thereof. The software may be stored on a non-transitory computer-readable storage medium (e.g., as a computer-program product). The particular series of processing steps depicted in FIG. 15 is not intended to be limiting.

As illustrated in FIG. 13, at step 1302, one or more control elements of a user interface can be displayed. The control elements may be user-selectable (e.g., via touch input), and may each correspond to a particular functionality. In some embodiments, some or all of the displayed control elements may correspond to functionalities of an application being executed by a computing device performing method 1300. In some embodiments, the displayed control elements may not be tied to a particular application. For instance, the one or more control elements may correspond to one or more application-independent functionalities of an operating system running on the computing device.

At step 1304, initial touch input can be received. In various embodiments, the initial touch input may correspond to a number of different user inputs. For instance, the initial touch input can include to a user-provided gesture (e.g., a single-tap, double-tap, drag, swipe, pinch, flick, rotation, multi-touch gestures, and the like). In some embodiments, the initial touch input may correspond to an initiation of an application. For instance, the initial touch input can correspond to the user executing a newly installed application for the first time. In some embodiments, the initial touch input can be a user-selection of a help element. Such a help element can be displayed in the user interface that includes the one or more control elements or can be displayed in a separate user interface. In some embodiments, the help element may be displayed in a help menu, options menu, tools menu, settings menu, or the like. In some embodiments, step 1304 can be performed before step 1302. For instance, if the initial touch input corresponds with the execution of an application, the one or more control elements of the application can be displayed to the user after the application has been executed.

At step 1306, an interactive element can be displayed in the user interface in response to the initial input received at step 1304. In some embodiments, the interactive element can be moved to various locations within the user interface in response to further touch input provided by the user. For instance, the further touch input may include a "dragging" gesture whereby the user applies a contact (e.g., a finger) to a region of the touchscreen on or near the interactive element and maintains the contact as the user "drags" their finger to a different region of the user interface. The interactive element can be moved about the user interface simultaneously and in accordance with the dragging gesture provided by the user. In some embodiments, the interactive element can include textual information prompting the user to drag the interactive element to any of the one or more control elements to receive further information about the functionality of a desired control element.

At step 1308, further touch input can be received, the further touch input corresponding to the user dragging the interactive element onto a control element. For instance, the user can move the interactive element over the control element such that the interactive element overlaps the control element. In some embodiments, the interactive element can dragged to a region of the user interface in the vicinity of the control element such that the elements are adjacent to each other but not overlapping.

At step 1310, in response to the user dragging the interactive element onto the control element, the interactive element can be associated with the control element. For instance, upon determining that the dragging input has stopped, the interactive element can be fixed on or adjacent to the control element in the user interface. In various embodiments, the association may include providing the user with any suitable indication that the interactive element is associated with the control element. For instance, the interactive element can be centered with respect to the control element. In some embodiments, the shape of the interactive element can be altered to include a graphical indicator (e.g., association portion 202' illustrated in FIG. 4) that can touch or overlap the control element. In some embodiments, other indications of the association can be provided including graphical indications (e.g., a color change, highlighting effect, shading effect, or the like of the interactive element and/or control element), audio indications, animation effects, etc.

At step 1312, content related to the functionality of the control element can be determined. In some embodiments, the content can be stored in a memory of a computing device performing method 1300 and, in some embodiments, all or a portion of the content can be stored in one or more remote databases (e.g., web-based server computers). In various embodiments, the content may be stored in the form of a data table that includes a mapping of control elements and corresponding content. For instance, for an application installed on a computing device performing method 1300, the data table can include a list of control elements for the application and a corresponding list of content that describes the functionality of each control element. In some embodiments, the data table can include a list of control elements that are application-independent (e.g., associated with the functionalities of an operating system running on computing device 100) and a list of content that describes the functionality of each corresponding control element. For a given control element, such information can include a name or identifier of the control element, a summary or explanation of the functionality of the control element (e.g., function performed in response to the user selecting the control element), or any other suitable information relating to the functionality of the control element.

At step 1314, the content related to the functionality of the control element can be displayed within the interactive element. The displayed content can inform the user of the function performed in response to the user selecting (or otherwise interacting with) the control element. In some embodiments, the interactive element can be resized in accordance with the amount of displayed content. For instance, the size of the interactive element can be automatically reduced or increased (e.g., in length and/or height) in accordance with the number of characters associated with the content to be displayed within the interactive element. In some embodiments, the interactive element can be resized in accordance with further touch input provided by the user. For instance, in response to the user providing a "pinch" gesture, the size of the interactive element can be reduced and/or increased in size.

Figure 14:
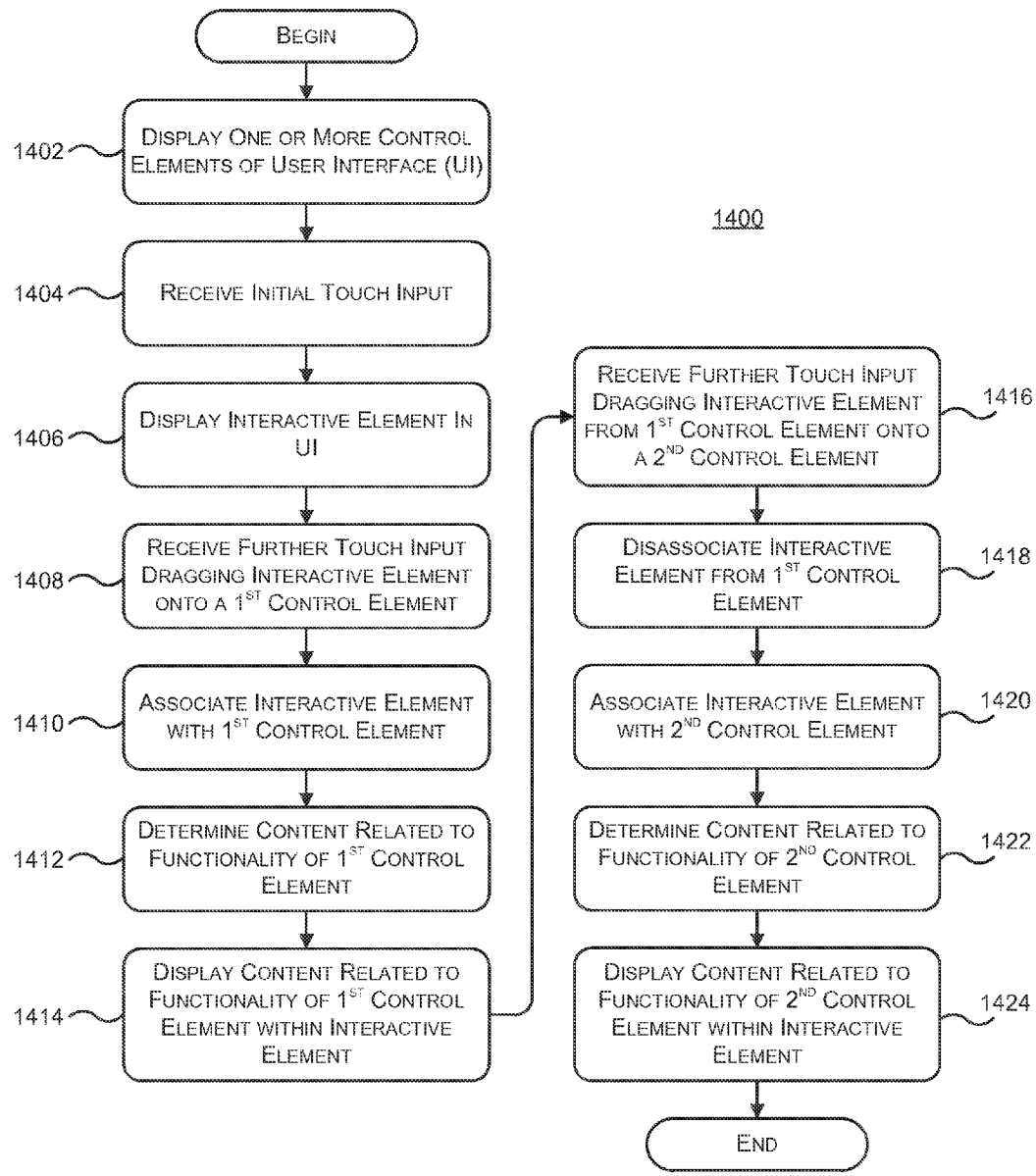
FIG. 14 illustrates a simplified flowchart depicting a method of displaying content relating to the functionality of a second control element within an interactive element in response to receiving touch input corresponding to dragging the interactive element from a first control element onto the second control element according to some embodiments.

In some embodiments, the user interface may include multiple control elements. Thus, upon reviewing content related to the functionality of a first control element (as displayed in the interactive element), the user may want to be informed of the functionality of a second control element. FIG. 14 illustrates a simplified flowchart depicting a method 1400 of displaying content relating to the functionality of a second control element within an interactive element in response to receiving touch input corresponding to dragging the interactive element from a first control element onto the second control element according to some embodiments.

In method 1400, steps 1402-1414 may be the same or similar to steps 1302-1314 of method 1300 illustrated in FIG. 13. Thus, in some embodiments, further details regarding steps 1402-1414 can be found above in the description of steps 1302-1314 of method 1300. In some embodiments, in response to the initial touch input received at step 1404, the interactive element can be displayed as being associated with the first control element without requiring the dragging touch input of step 1408. For instance, steps 1404-1406 and 1410-1414 can be performed automatically in response to the initial touch input received at step 1404. In such embodiments, when the interactive element appears in the user interface, the interactive element can already be associated with the first control element with content related to the functionality of the first control element being displayed within the interactive element.

At step 1416, further touch input can be received, the further touch input corresponding to the user dragging the interactive element from the first control element to a second control element. For instance, the user can move the interactive element from the first control element onto the second control element such that the interactive element overlaps the second control element. In some embodiments, the interactive element can be dragged to a region of the user interface in the vicinity of the second control element such that the elements are adjacent to each other but not overlapping.

At step 1418, as the interactive element is moved away from the first control element, it can be disassociated from the first control element. For instance, a graphical indication that the interactive element is associated with the first control element can no longer be displayed once the interactive element is dragged away from the first control element. In various embodiments, the user can be informed that the interactive element has been disassociated from the first control element using any suitable indication including graphical indications (e.g., a color change, highlighting effect, shading effect, and the like of the interactive element and/or the first control element), audio indications, animation effects, etc.

At step 1420, in response to the user dragging the interactive element onto the second control element, the interactive element can be associated with the second control element. For instance, upon determining that the dragging input has stopped, the interactive element can be fixed on or adjacent to the second control element in the user interface. In various embodiments, as with the association of the first control element described above with respect to step 1310 of method 1300, the association of the second control element may include providing the user with any suitable indication that the interactive element is associated with the second control element. For instance, the interactive element can be centered with respect to the second control element. In some embodiments, the shape of the interactive element can be altered to include a graphical indicator (e.g., association portion 202' illustrated in FIG. 6) that can touch or overlap the second control element. In some embodiments, other indications of the association can be provided including graphical indications (e.g., a color change, highlighting effect, shading effect, or the like of the interactive element and/or the second control element), audio indications, animation effects, etc.

At step 1422, content related to the functionality of the second control element can be determined. As described above with respect to the content related to the functionality of the first control element, in some embodiments, the content related to the functionality of the second control element can be stored in a memory of a computing device performing method 1400 and, in some embodiments, all or a portion of the content can be stored in one or more remote databases (e.g., web-based server computers). In various embodiments, the content related to the functionality of the second control element may be stored in the form of a data table that includes a mapping of control elements and corresponding content as described above.

At step 1424, the content related to the functionality of the second control element can be displayed within the interactive element. The displayed content can inform the user of the function performed in response to the user selecting (or otherwise interacting with) the second control element. In some embodiments, as described above, the interactive element can be resized in accordance with the amount of displayed content related to the functionality of the second control element. For instance, the size of the interactive element can be automatically reduced or increased (e.g., in length and/or height) in accordance with the number of characters associated with the content to be displayed within the interactive element. In some embodiments, the interactive element can be resized in accordance with further touch input provided by the user. For instance, in response to the user providing a "pinch" gesture, the size of interactive element 202 can be reduced and/or increased in size.

In some embodiments, the user may desire that the interactive element no longer be displayed in the user interface. FIG. 15 illustrates a simplified flowchart depicting a method 1500 of removing an interactive element from a user interface in response to receiving touch input corresponding to dragging the interactive element to a region of the user interface associated with no control elements according to some embodiments.

In method 1500, steps 1502-1514 may be the same or similar to steps 1302-1314 of method 1300 illustrated in FIG. 13. Thus, in some embodiments, further details regarding steps 1502-1514 can be found above in the description of steps 1302-1314 of method 1300.

At step 1514, the content related to the functionality of a control element can be displayed within the interactive element. At step 1516, further touch input can be received, the further touch input corresponding to the user dragging the interactive element from the control element to a region of the user interface associated with no control elements. For instance, the user can move the interactive element from the control element to a region of the user interface that exceeds some predetermined distance from any of the displayed control elements.

At step 1518, as the interactive element is moved away from the control element, it can be disassociated from the control element. For instance, as described above, a graphical indication that the interactive element is associated with the control element can no longer be displayed once the interactive element is dragged away from the control element. In various embodiments, the user can be informed that the interactive element has been disassociated from the control element using any suitable indication including graphical indications (e.g., a color change, highlighting effect shading effect, and the like of the interactive element and/or the control element), audio indications, animation effects, etc.

At step 1520, the interactive element can be removed from the user interface. Thus, upon dragging the interactive element to a region of the user interface associated with no control elements, the interactive element may no longer be displayed in the user interface. If the user desires at a later time that the interactive element be displayed again, the user may provide "initial" touch input as described above with respect to step 1304 of method 1300 illustrated in FIG. 13.

As described herein, embodiments of the invention can relate to a computing device displaying content related to the functionality of control elements of a user interface within a moveable interactive element. By displaying content related to the functionality of such control elements within the moveable interactive element, a user can be made aware of the result of selecting a control element in a graphical manner that occupies only a small portion of an application's user interface. Thus, the underlying application may be both functional and visible to the user while the interactive element is being displayed. Further, upon being dragged by the user onto potentially any control element of an application, content related to the control element can be displayed within the interactive element immediately. Thus, users may be provided with information about the functionality of an application's control elements in a quick and convenient manner, thereby reducing the need for a user to use a "trial by error" approach or to perform the cumbersome and inefficient task of reviewing an application's user manual to determine such functionalities.

In various embodiments of the invention, any content relevant to a user can be provided within the interactive element in response to the user dragging or otherwise interacting with the interactive element. For instance, in the context of a map application, the interactive element can display content related to a city, landmark, location, etc., in response to the user dragging the interactive element onto a corresponding region of a displayed map. Such content can include descriptions, nearby attractions, historical information, and the like. As another example, in the context of a tutorial application, content can be displayed within the interactive element that facilitates a tutorial. For instance, a tutorial application may provide instructions for assembling or operating a consumer product, and the interactive element can display content related to the assembly steps or operation of the product. As yet another example, in the context of a mathematics application, content can be displayed within the interactive element to provide instructions for solving an equation or other problem. In some embodiments, content displayed within the interactive element can include images, hyperlinks, and/or written content related to products, applications, etc., being suggested to the user. Further, in some embodiments, the interactive element can be associated with any suitable graphical user interface element, and any suitable content related to such graphical user interface elements can be displayed within the interactive element.

Figure 16:
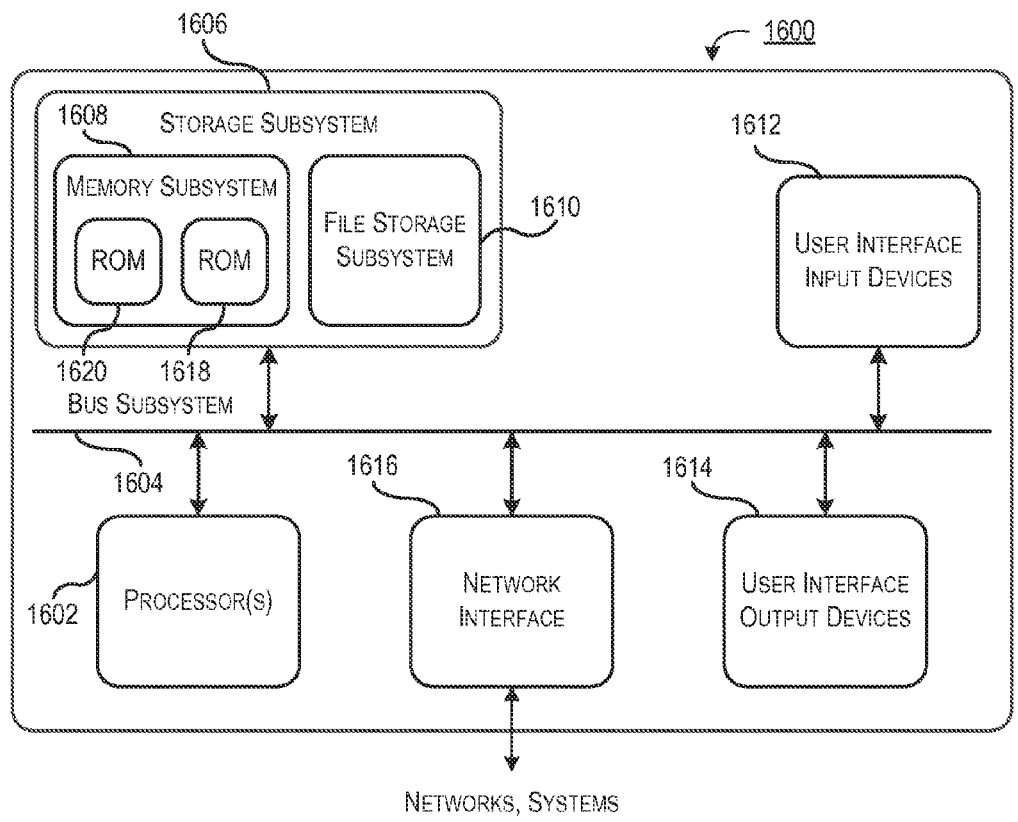
FIG. 16 illustrates a simplified block diagram of a computer system that may incorporate components of a system for displaying content related to the functionality of control elements of a user interface within a moveable interactive element according to some embodiments.

As described above, system 1100 may incorporate embodiments of the invention. System 1100 may display content related to the functionality of control elements of a user interface within a moveable interactive element, as described herein, in one or more of the exemplary user interfaces discussed above with respect to FIGS. 1-10, and/or may further provide one or more of the method steps discussed above with respect to FIGS. 13-15. Moreover, system 1100 may be incorporated into various systems and devices. For instance, FIG. 16 illustrates a simplified block diagram of a computer system 1600 that may incorporate components of a system for displaying content related to the functionality of control elements of a user interface within a moveable interactive element according to some embodiments. As shown in FIG. 16, computer system 1600 may include one or more processors 1602 that communicate with a number of peripheral subsystems via a bus subsystem 1604. These peripheral subsystems may include a storage subsystem 1606, including a memory subsystem 1608 and a file storage subsystem 1610, user interface input devices 1612, user interface output devices 1614, and a network interface subsystem 1616.

Bus subsystem 1604 provides a mechanism for letting the various components and subsystems of computer system 1600 communicate with each other as intended. Although bus subsystem 1604 is shown schematically as a single bus, alternative embodiments of the bus subsystem may utilize multiple busses.

Processor 1602, which can be implemented as one or more integrated circuits (e.g., a conventional microprocessor or microcontroller), controls the operation of computer system 1600. One or more processors 1602 may be provided. These processors may include single core or multicore processors. In various embodiments, processor 1602 can execute a variety of programs in response to program code and can maintain multiple concurrently executing programs or processes. At any given time, some or all of the program code to be executed can be resident in processor(s) 1602 and/or in storage subsystem 1606. Through suitable programming, processor(s) 1602 can provide various functionalities described above.

Network interface subsystem 1616 provides an interface to other computer systems and networks. Network interface subsystem 1616 serves as an interface for receiving data from and transmitting data to other systems from computer system 1600. For example, network interface subsystem 1616 may enable computer system 1600 to connect to one or more devices via the Internet. In some embodiments network interface 1616 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments network interface 1616 can provide wired network connectivity (e.g., Ethernet) in addition to or instead of a wireless interface.

User interface input devices 1612 may include a keyboard, pointing devices such as a mouse or trackball, a touchpad or touch screen incorporated into a display, a scroll wheel, a click wheel a dial, a button, a switch, a keypad, audio input devices such as voice recognition systems, microphones, and other types of input devices. In general, use of the term "input device" is intended to include all possible types of devices and mechanisms for inputting information to computer system 1600. For example, in an iPhone®, user input devices 1612 may include one or more buttons provided by the iPhone® and a touchscreen which may display a software keyboard, and the like.

User interface output devices 1614 may include a display subsystem, indicator lights, or non-visual displays such as audio output devices, etc. The display subsystem may be a cathode ray tube (CRT), a flat-panel device such as a liquid crystal display (LCD), a projection device, a touch screen, and the like. In general, use of the term "output device" is intended to include all possible types of devices and mechanisms for outputting information from computer system 1600. For example, a software keyboard may be displayed using a flat-panel screen.

Storage subsystem 1606 provides a computer-readable storage medium for storing the basic programming and data constructs that provide the functionality of some embodiments. Storage subsystem 1606 can be implemented, e.g., using disk, flash memory, or any other storage media in any combination, and can include volatile and/or non-volatile storage as desired. Software (programs, code modules, instructions) that when executed by a processor provide the functionality described above may be stored in storage subsystem 1606. These software modules or instructions may be executed by processor(s) 1602. Storage subsystem 1606 may also provide a repository for storing data used in accordance with the present invention. Storage subsystem 1606 may include memory subsystem 1608 and file/disk storage subsystem 1610.

Memory subsystem 1608 may include a number of memories including a main random access memory (RAM) 1618 for storage of instructions and data during program execution and a read only memory (ROM) 1620 in which fixed instructions are stored. File storage subsystem 1610 provides persistent (non-volatile) memory storage for program and data files, and may include a hard disk drive, a floppy disk drive along with associated removable media, a Compact Disk Read Only Memory (CD-ROM) drive, an optical drive, removable media cartridges, and other like memory storage media.

Computer system 1600 can be of various types including a personal computer, a portable device (e.g., an iPhone®, an iPad®), a workstation, a network computer, a mainframe, a kiosk, a server or any other data processing system. Due to the ever-changing nature of computers and networks, the description of computer system 1600 depicted in FIG. 16 is intended only as a specific example. Many other configurations having more or fewer components than the system depicted in FIG. 16 are possible.

Embodiments can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a non-transitory computer-readable medium for execution by, or to control the operation of data processing apparatus.

Various embodiments described above can be realized using any combination of dedicated components and/or programmable processors and/or other programmable devices. The various embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

The various embodiments are not restricted to operation within certain specific data processing environments, but are free to operate within a plurality of data processing environments. Additionally, although embodiments have been described using a particular series of transactions, this is not intended to be limiting.

Thus, although specific invention embodiments have been described, these are not intended to be limiting. Various modifications and equivalents are within the scope of the following claims.

What is claimed is:

1. A computer-implemented method, comprising:
   displaying, by a computing device, one or more control elements of a user interface;
   receiving initial touch input;
   in response to the initial touch input, displaying an interactive element in the user interface;
   receiving further touch input corresponding to dragging the interactive element onto a control element;
   associating the interactive element with the control element;
   determining content related to the functionality of the control element;
   displaying the content within the interactive element;
   receiving further touch input corresponding to dragging the interactive element associated with the control element to a region of the user interface associated with no control elements;
   disassociating the interactive element from the control element; and
   removing the interactive element from the user interface.

2. A computer-implemented method, comprising:
   displaying, by a computing device, one or more control elements of a user interface:
   receiving initial touch input, wherein the initial touch input corresponds to an initiation of an application;
   in response to the initial touch input, displaying an interactive element in the user interface:
   receiving further touch input corresponding to dragging the interactive element onto a control element;
   associating the interactive element with the control element;
   determining content related to the functionality of the control element; and
   displaying the content within the interactive element.

3. A computer-implemented method, comprising:
   displaying, by a computing device, one or more control elements of a user interface;
   receiving initial touch input;
   in response to the initial touch input, displaying an interactive element in the user interface;
   receiving further touch input corresponding to dragging the interactive element onto a control element;
   associating the interactive element with the control element;
   determining content related to the functionality of the control element, wherein determining the content related to the functionality of the control element comprises retrieving the content from a data table; and
   displaying the content within the interactive element.

4. The method of claim 3, wherein the data table is stored in a memory of the computing device.

5. The method of claim 3, wherein the data table is stored in a remote database.

6. A computer-implemented system, comprising:
   one or more data processors; and
   one or more non-transitory computer-readable storage media containing instructions configured to cause the one or more processors to perform operations including:
   displaying one or more control elements of a user interface;
   receiving initial touch input;
   in response to the initial touch input, displaying an interactive element in the user interface;
   receiving further touch input corresponding to dragging the interactive element onto a control element;
   associating the interactive element with the control element;
   determining content related to the functionality of the control element;

displaying the content within the interactive element;
receiving further touch input corresponding to dragging the interactive element associated with the control element to a region of the user interface associated with no control elements;
disassociating the interactive element from the control element; and
removing the interactive element from the user interface.

7. A computer-implemented system, comprising:
one or more data processors; and
one or more non-transitory computer-readable storage media containing instructions configured to cause the one or more processors to perform operations including:
displaying one or more control elements of a user interface;
receiving initial touch input, wherein the initial touch input corresponds to an initiation of an application;
in response to the initial touch input, displaying an interactive element in the user interface;
receiving further touch input corresponding to dragging the interactive element onto a control element;
associating the interactive element with the control element;
determining content related to the functionality of the control element; and
displaying the content within the interactive element.

8. A computer-implemented system, comprising:
one or more data processors; and
one or more non-transitory computer-readable storage media containing instructions configured to cause the one or more processors to perform operations including:
displaying one or more control elements of a user interface;
receiving initial touch input;
in response to the initial touch input, displaying an interactive element in the user interface;
receiving further touch input corresponding to dragging the interactive element onto a control element;
associating the interactive element with the control element;
determining content related to the functionality of the control element, wherein determining the content related to the functionality of the control element comprises retrieving the content from a data table; and
displaying the content within the interactive element.

9. The system of claim 8, wherein the data table is stored in a memory of the system.

10. The system of claim 8, wherein the data table is stored in a remote database.

11. A computer-program product, tangibly embodied in a non-transitory machine-readable storage medium, including instructions configured to cause a data processing apparatus to:
display one or more control elements of a user interface;
receive initial touch input;
in response to the initial touch input, display an interactive element in the user interface;
receive further touch input corresponding to dragging the interactive element onto a control element;
associate the interactive element with the control element;
determine content related to the functionality of the control element;
display the content within the interactive element;
receive further touch input corresponding to dragging the interactive element associated with the control element to a region of the user interface associated with no control elements;
disassociate the interactive element from the control element; and
remove the interactive element from the user interface.

12. A computer-program product, tangibly embodied in a non-transitory machine-readable storage medium, including instructions configured to cause a data processing apparatus to:
display one or more control elements of a user interface;
receive initial touch input, wherein the initial touch input corresponds to an initiation of an application;
in response to the initial touch input, display an interactive element in the user interface;
receive further touch input corresponding to dragging the interactive element onto a control element;
associate the interactive element with the control element;
determine content related to the functionality of the control element; and
display the content within the interactive element.

13. A computer-program product, tangibly embodied in a non-transitory machine-readable storage medium, including instructions configured to cause a data processing apparatus to:
display one or more control elements of a user interface;
receive initial touch input;
in response to the initial touch input, display an interactive element in the user interface;
receive further touch input corresponding to dragging the interactive element onto a control element;
associate the interactive element with the control element;
determine content related to the functionality of the control element, wherein determining the content related to the functionality of the control element comprises retrieving the content from a data table; and
display the content within the interactive element.

14. The computer-program product of claim 13, wherein the data table is stored in a memory.

15. The computer-program product of claim 13, wherein the data table is stored in a remote database.

* * * * *